(12) United States Patent
Dembski et al.

(10) Patent No.: US 12,546,797 B2
(45) Date of Patent: Feb. 10, 2026

(54) FLOW CYTOMETERS INCLUDING SAMPLE INJECTION NEEDLES, AND METHODS OF USE THEREOF

(71) Applicant: Becton, Dickinson and Company, Franklin Lakes, NJ (US)

(72) Inventors: Kyle Dembski, Scotts Valley, CA (US); Pierce O. Norton, Los Gatos, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 286 days.

(21) Appl. No.: 18/215,402

(22) Filed: Jun. 28, 2023

(65) Prior Publication Data

US 2024/0019456 A1    Jan. 18, 2024

Related U.S. Application Data

(60) Provisional application No. 63/388,406, filed on Jul. 12, 2022.

(51) Int. Cl.
*G01N 15/10* (2024.01)
*G01N 15/14* (2006.01)
(Continued)

(52) U.S. Cl.
CPC ..... *G01N 35/1095* (2013.01); *G01N 15/1404* (2013.01); *G01N 15/1436* (2013.01); *G01N 15/1459* (2013.01); *G01N 15/1409* (2024.01)

(58) Field of Classification Search
CPC .......... G01N 35/1095; G01N 15/1404; G01N 15/1436; G01N 15/1459; G01N 15/1409; G01N 2015/1006; G01N 15/149; G01N 2015/1413; G01N 2015/1486; G01N 15/1012; G01N 2015/1019; G01N 2015/1024; G01N 15/14; G01N 15/12
(Continued)

(56) References Cited

U.S. PATENT DOCUMENTS 6,365,106 B1    4/2002   Nagai
10,451,612 B2   10/2019  Farrell
(Continued)

FOREIGN PATENT DOCUMENTS

CA   2518882 C   *  5/2017   ............... C12Q 1/02
CN   2748919 Y   * 12/2005
(Continued)

*Primary Examiner* — Robert R Raevis
(74) *Attorney, Agent, or Firm* — Bret E. Field; BOZICEVIC, FIELD & FRANCIS LLP

(57) ABSTRACT

Flow cytometers having sample injection needles are provided. The subject flow cytometers include a flow cell for transporting particles in a core stream of a flow stream from a proximal end to a distal end, and a sample injection needle having a passage running therethrough for delivering sample fluid from a sample injection line at a proximal end to the flow cell at a distal end to generate the core stream. Flow cells of interest include a flow cell cone at the proximal end, and sample injection needles of interest are configured and positioned to maintain an intact core stream under flow conditions that vary by a magnitude or more. Methods of assembling the subject flow cytometers and methods of analyzing a sample using the subject flow cytometers are also provided.

20 Claims, 14 Drawing Sheets

(51) Int. Cl.
*G01N 15/1404* (2024.01)
*G01N 15/1434* (2024.01)
*G01N 35/10* (2006.01)
*G01N 15/1409* (2024.01)

(58) Field of Classification Search
USPC ... 73/61.42, 61.71, 61.73–61.75, 863, 865.5; 324/71.4; 356/441, 442
See application file for complete search history.

(56) References Cited

U.S. PATENT DOCUMENTS

| | | |
|---|---|---|
| 10,583,439 B2 | 3/2020 | Koksai et al. |
| 2013/0020498 A1 | 1/2013 | Ebi et al. |
| 2017/0106368 A1* | 4/2017 | Thomas ............ B01L 3/502715 |
| 2020/0317453 A1 | 10/2020 | Gilbert et al. |

FOREIGN PATENT DOCUMENTS

| | | | | |
|---|---|---|---|---|
| CN | 201281686 Y | * | 7/2009 | |
| CN | 101726454 | * | 6/2010 | |
| CN | 204903353 | | 12/2015 | |
| CN | 206192843 | | 5/2017 | |
| JP | H0534261 | | 2/1993 | |
| WO | WO199905504 A2 | | 2/1999 | |
| WO | WO-0056429 A1 | * | 9/2000 | ............ H01J 9/0445 |
| WO | WO-2006052822 A2 | * | 5/2006 | ........ G01N 33/57411 |
| WO | WO-2016018678 A1 | * | 2/2016 | ........ B01L 3/502784 |

* cited by examiner

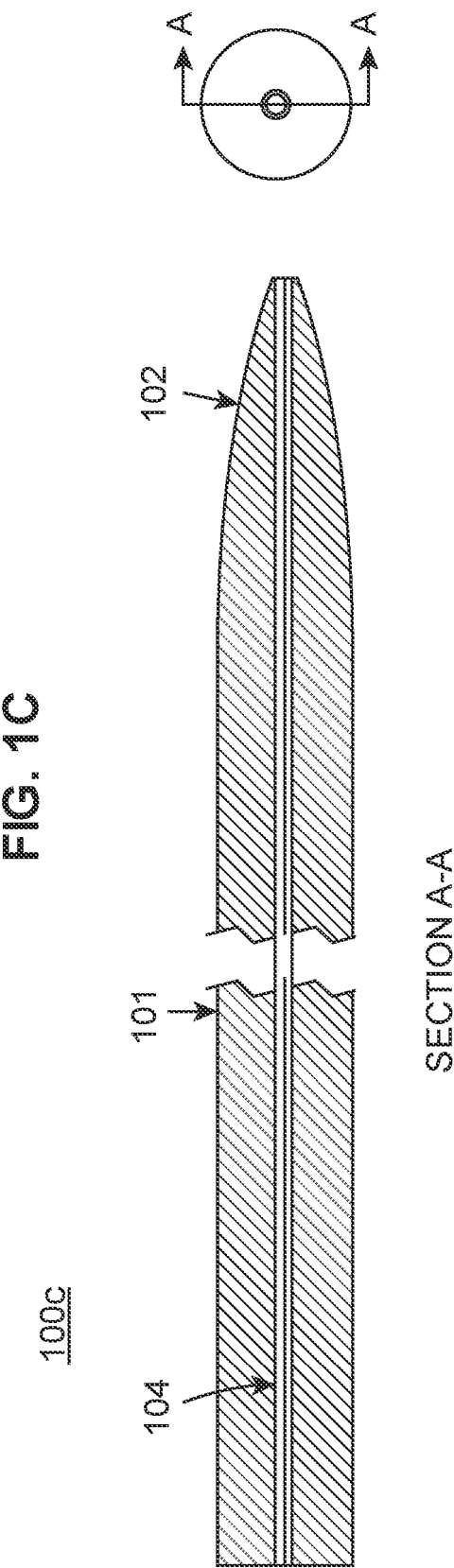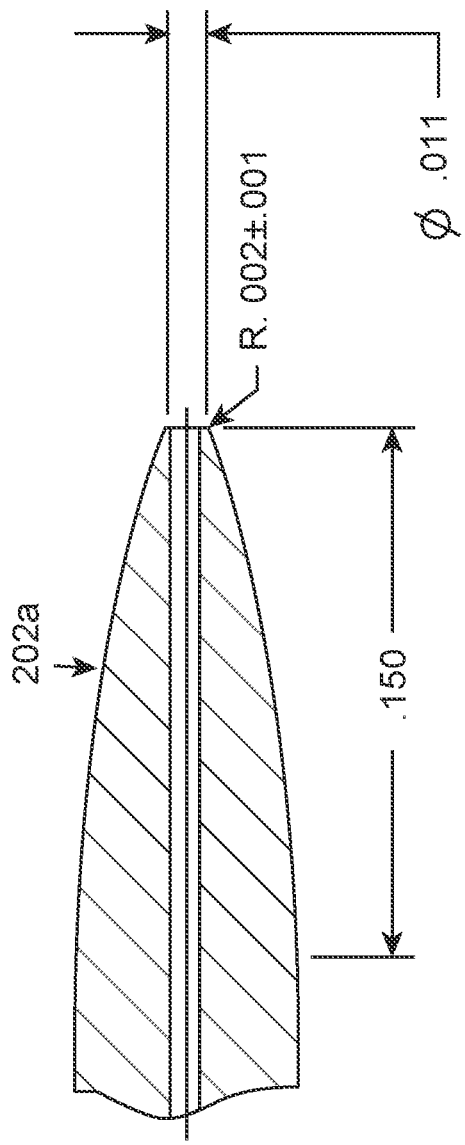

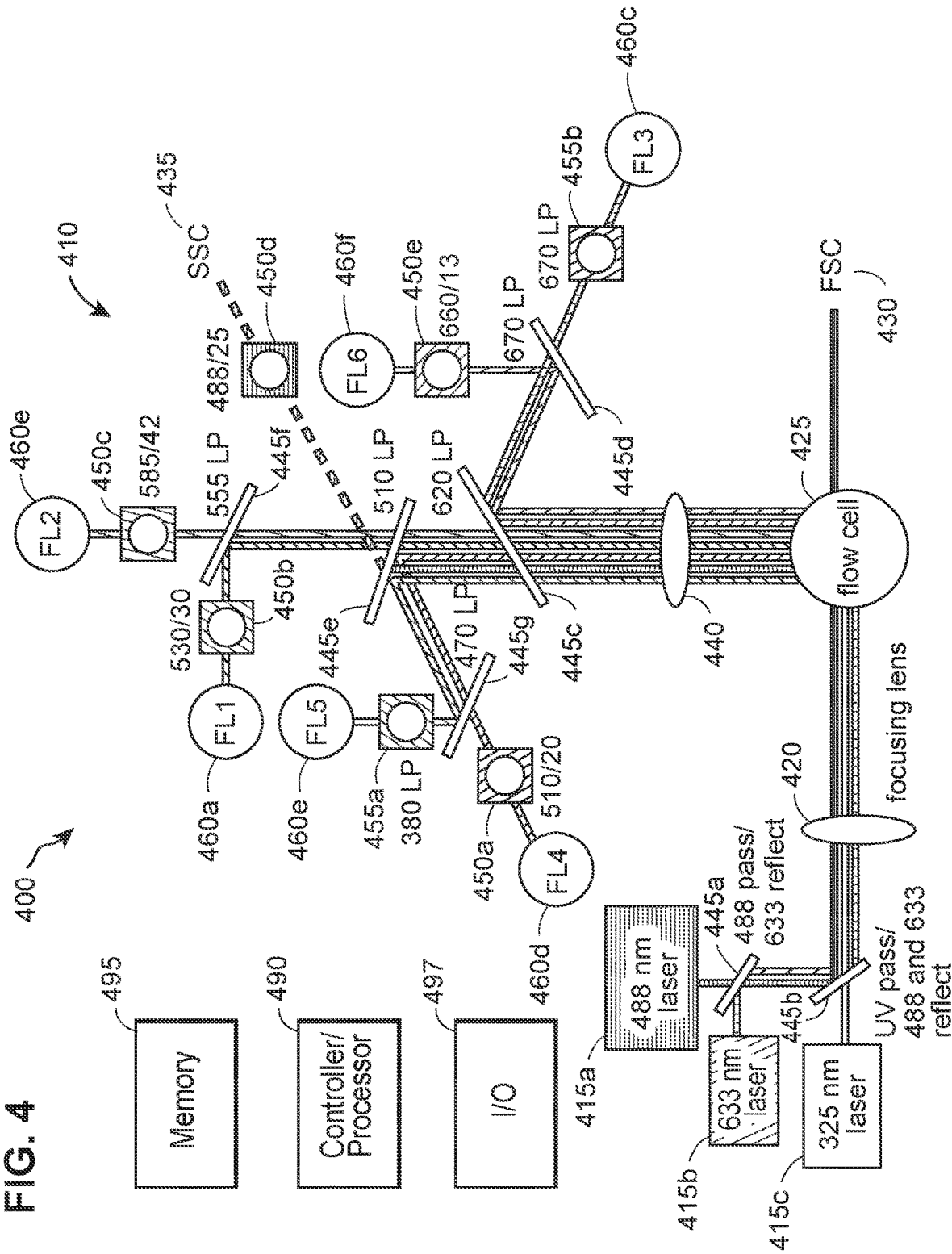

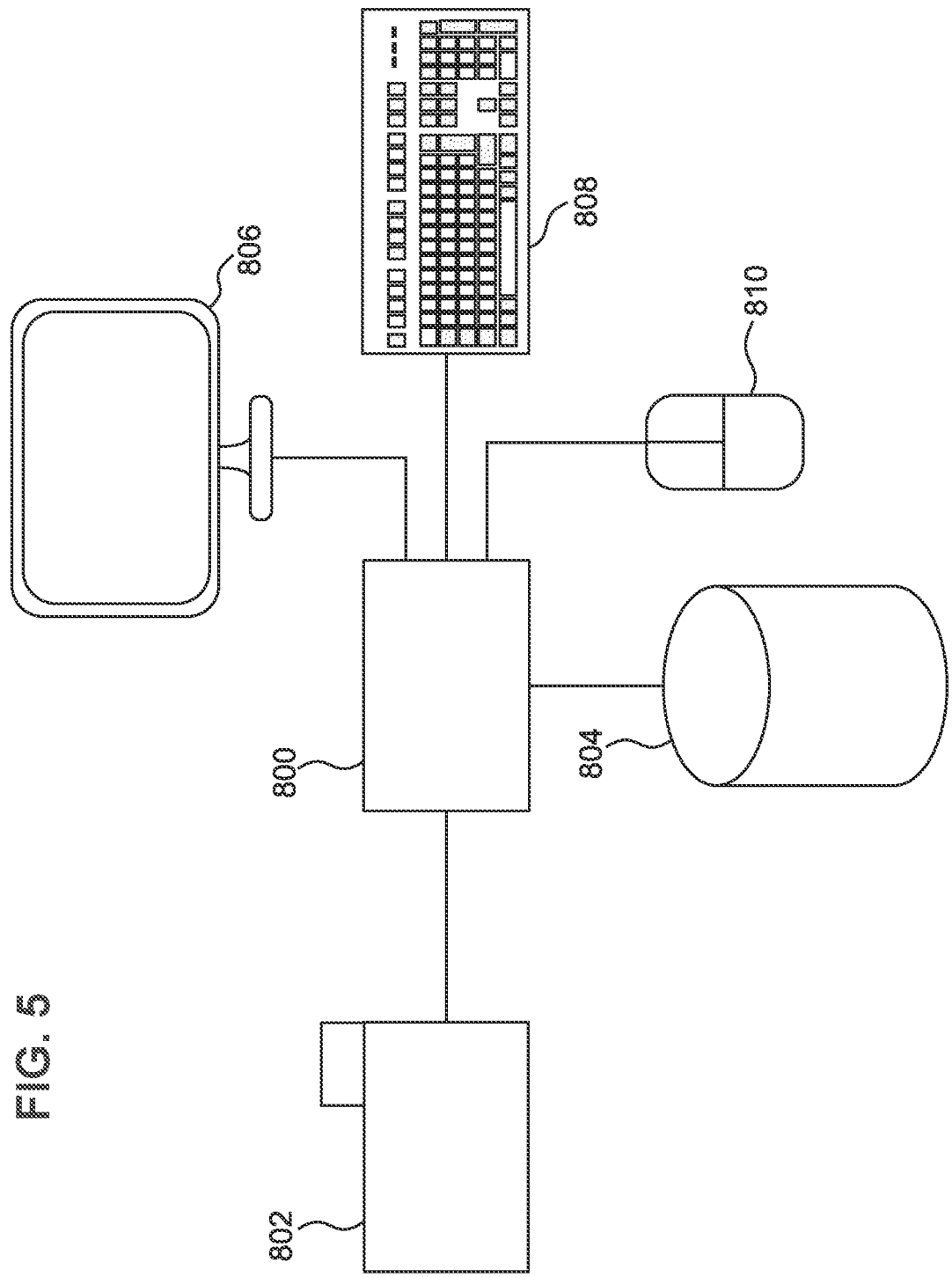

FLOW CYTOMETERS INCLUDING SAMPLE INJECTION NEEDLES, AND METHODS OF USE THEREOF

CROSS-REFERENCE TO RELATED APPLICATION

Pursuant to 35 U.S.C. § 119 (e), this application claims priority to the filing date of U.S. Provisional Patent Application Ser. No. 63/388,406 filed Jul. 12, 2022; the disclosure of which application is incorporated herein by reference in its entirety.

INTRODUCTION

The characterization of analytes in biological fluids has become an important part of biological research, medical diagnoses and assessments of overall health and wellness of a patient. Detecting analytes in biological fluids, such as human blood or blood derived products, can provide results that may play a role in determining a treatment protocol of a patient having a variety of disease conditions.

Flow cytometry is a technique used to characterize and often times sort biological material, such as cells of a blood sample or particles of interest in another type of biological or chemical sample. A flow cytometer typically includes a sample reservoir for receiving a fluid sample, such as a blood sample, and a sheath reservoir containing a sheath fluid. The flow cytometer transports the particles (including cells) in the fluid sample as a cell stream to a flow cell, while also directing the sheath fluid to the flow cell. To characterize the components of the flow stream, the flow stream is irradiated with light. Variations in the materials in the flow stream, such as morphologies or the presence of fluorescent labels, may cause variations in the observed light and these variations allow for characterization and separation. To characterize the components in the flow stream, light must impinge on the flow stream and be collected. Light sources in flow cytometers can vary and may include one or more broad spectrum lamps, light emitting diodes as well as single wavelength lasers. The light source is aligned with the flow stream and an optical response from the illuminated particles is collected and quantified.

Some flow cytometer systems have been implemented using pressure-driven fluidics in which the sample and sheath fluid are provided to a flow cell, which contains the detection region, under a pressure greater than ambient pressure. Changes in the flow rate through the flow cell of a pressure-driven fluidics system are achieved by varying the pressure in the sample tube and/or the sheath fluid reservoir that feed into the flow cell. The ratio of sample fluid to sheath fluid flowing through the flow cell is governed both by the pressure levels in the sample tube and sheath fluid reservoir, and by the ratio of the resistances of the sample fluid and sheath fluid paths.

Alternatively, flow cytometer systems have been implemented using vacuum-driven fluidics in which a vacuum pump draws a vacuum downstream of the flow cell, and the sample and sheath fluids are held at ambient pressure. Changes in the flow rate through the flow cell of a vacuum-driven fluidics system are achieved by varying the vacuum drawn by the vacuum pump, and the ratio of sample fluid to sheath fluid flowing through the flow cell is governed by the ratio of the resistances of sample fluid and sheath fluid paths.

Some flow cytometers include an injection needle, which plays an important role in introducing the sample to the flow cell. The sheath flow inside of the flow cell helps to establish a sample core and allows the sample cells to pass the interrogation point at the cuvette in a single-file style. This technique is known as hydrodynamic focusing.

SUMMARY

The present inventors have realized that imaging particles using a flow cytometer requires precise control of the speed at which cells travel within an interrogation point (i.e., where the sample is irradiated by the one or more lasers). It was discovered that where such precise control is not achieved, a breakdown of the flow stream and core stream may be a result. In particular, the inventors found that conventional sample injection mechanisms create "eddies" of fluid that are associated with perturbations in the flow stream and core stream. As such, it was realized that flow cytometers having improved sample injection needles are desirable. Embodiments of the invention satisfy this desire.

Aspects of the invention include flow cytometers. The subject flow cytometers include a flow cell for transporting particles in a core stream of a flow stream from a proximal end to a distal end, and a sample injection needle having a passage running therethrough for delivering sample fluid from a sample injection line at a proximal end to the flow cell at a distal end to generate the core stream. Flow cells of interest include a flow cell cone at the proximal end, and sample injection needles of interest are configured and positioned to maintain an intact core stream under flow conditions that vary by a magnitude or more. In some embodiments, the flow cell includes a sheath fluid introduction port for delivering sheath fluid to the flow cell. In some such embodiments, the distal end of the sample injection needle is positioned within the flow cell cone and is separated from the sheath fluid introduction point by a longitudinal distance ranging from 17 mm to 26 mm (e.g., from 20 mm to 22 mm). In some cases, the sample injection needle is configured and positioned to maintain an intact core stream under the condition that the flow rate of the flow stream ranges from 0.5 m/s to 10 m/s. The sample injection needle may, in select instances, be configured and positioned to maintain an intact core stream under the condition that the flow rate of the sample fluid ranges from 1 µl/min to 150 µl/min. In some cases, the sample injection needle comprises an inner diameter ranging from 0.2 mm to 0.4 mm (e.g., 0.25 mm to mm). In certain versions, the sample injection needle comprises a taper at the distal end. In some such versions, the taper begins at a location along the length of the sample injection needle that is separated from the distal end by a distance ranging from 3.5 mm to 4.0 mm (e.g., from 3.8 mm to 3.9 mm). In other versions, the taper begins at a location along the length of the sample injection needle that is separated from the distal end by a distance ranging from 1.5 mm to 2.0 mm (e.g., from 1.7 mm to 1.8 mm). In certain embodiments, the sample injection needle includes a taper range of 2.5 mm-12 mm radius across a length of 1.75 mm-4 mm. In some embodiments, the sample injection needle comprises a rounded distal end. In select instances, the flow cytometer comprises a plurality of sheath fluid introduction ports, such as where the plurality of sheath fluid introduction ports are offset from one another such that the sheath fluid swirls through the flow cell cone. Embodiments of the subject flow cytometers also include a light source configured to illuminate the flow cell at an interrogation point. In some cases, the distal end of the flow cell is separated from the interrogation point by a distance ranging from 13 mm to 17 mm (e.g., from 14 to 16 mm). In embodiments, flow cytometers of the invention include one or more detectors configured to collect light from the flow cell. In certain versions, flow cytometers include a vacuum configured to draw fluid through the flow cell.

Aspects of the invention also include methods of analyzing a sample. Methods of interest include introducing a particulate sample into a flow cytometer comprising the subject flow cell and sample injection needle, and flow cytometrically sorting the particulate sample. As discussed above, the subject flow cytometers include a flow cell for transporting particles in a core stream of a flow stream from a proximal end to a distal end, and a sample injection needle having a passage running therethrough for delivering sample fluid from a sample injection line at a proximal end to the flow cell at a distal end to generate the core stream. Flow cells of interest include a flow cell cone at the proximal end, and sample injection needles of interest are configured and positioned to maintain an intact core stream under flow conditions that vary by a magnitude or more. In some instances, the particulate sample is a biological sample (e.g., cells).

Aspects of the invention further include methods of assembling a flow cytometer. Methods of interest include positioning a sample injection needle within a flow cytometer. As discussed above, the subject flow cytometers include a flow cell for transporting particles in a core stream of a flow stream from a proximal end to a distal end, and a sample injection needle having a passage running therethrough for delivering sample fluid from a sample injection line at a proximal end to the flow cell at a distal end to generate the core stream. Flow cells of interest include a flow cell cone at the proximal end, and sample injection needles of interest are configured and positioned to maintain an intact core stream under flow conditions that vary by a magnitude or more.

BRIEF DESCRIPTION OF THE FIGURES

The invention may be best understood from the following detailed description when read in conjunction with the accompanying drawings. Included in the drawings are the following figures:

FIG. 1A-1C depict sample injection needles according to certain embodiments of the invention.

FIG. 2A-2C present illustrations of the distal ends of sample injection needles according to certain embodiments of the invention.

FIG. 4 depicts a functional block diagram of a flow cytometric system according to certain embodiments.

FIG. 5 depicts a control system according to certain embodiments. 1.0

DETAILED DESCRIPTION

Figure 1B:
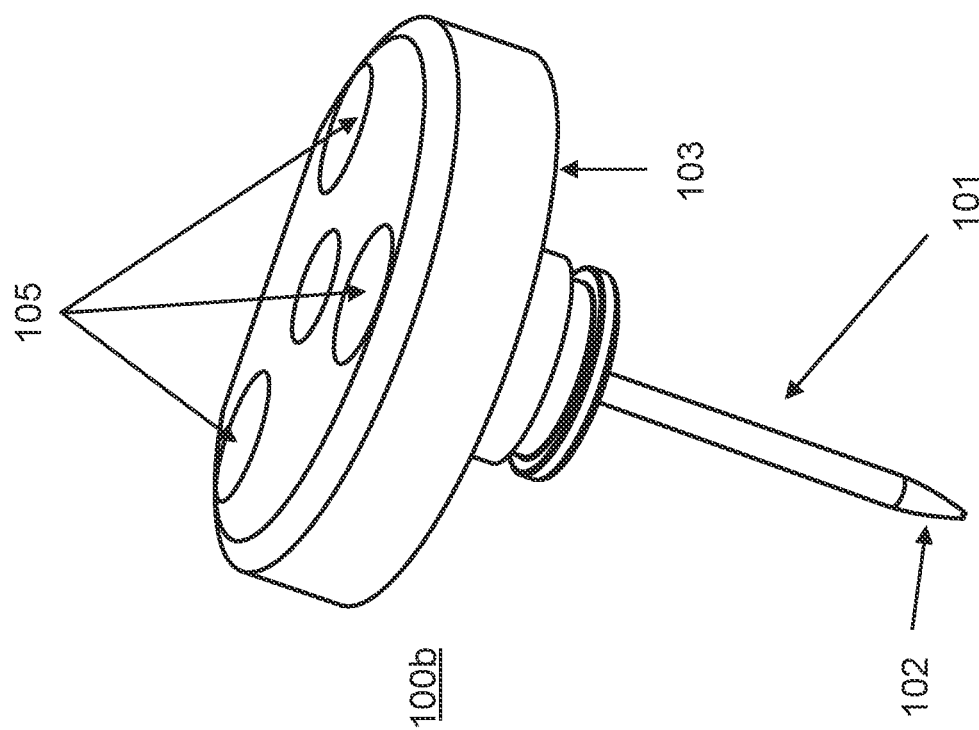

Flow cytometers having sample injection needles are provided. The subject flow cytometers include a flow cell for transporting particles in a core stream of a flow stream from a proximal end to a distal end, and a sample injection needle having a passage running therethrough for delivering sample fluid from a sample injection line at a proximal end to the flow cell at a distal end to generate the core stream. Flow cells of interest include a flow cell cone at the proximal end, and sample injection needles of interest are configured and positioned to maintain an intact core stream under flow conditions that vary by a magnitude or more. Methods of assembling the subject flow cytometers and methods of analyzing a sample using the subject flow cytometers are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the system and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Flow Cytometers

As discussed above, aspects of the invention include flow cytometers. Flow cytometers of interest include a flow cell for transporting particles in a core stream of a flow stream from a proximal end to a distal end, and a sample injection needle having a passage running therethrough for delivering sample fluid from a sample injection line at a proximal end to the flow cell at a distal end to generate the core stream. The "core stream" discussed herein is referred to in its conventional sense to describe a fluid stream in which particles are transported through the flow cell that is focused (e.g., hydrodynamically focused) by a sheath fluid stream. In general, particles are transported through the core stream in a single-file manner. The size (e.g., diameter) of the core stream may vary as desired. In some instances, the core stream may possess a diameter that is approximately the same as the diameter of the particles being analyzed. In some cases, the diameter of the core stream ranges from 5 μm to 25 μm, including 10 μm to 20 μm. Core stream diameter may be adjusted in proportion to the pressure (e.g., positive pressure or negative pressure) applied to the particles as they are injected into the sheath fluid stream. In some cases, the flow rate of the sheath fluid remains constant. In this manner, particles are injected into the sheath fluid and hydrodynamically focused such that laminar flow is generated and the particles travel along the same axis at approximately the same rate.

A core stream associated with the present invention may be described as "intact" if said core stream maintains a relatively constant shape throughout the length of the flow cell. In some cases, an intact core stream of the invention is defined by straight edges. In other words, when viewed two-dimensionally, the boundaries of an intact flow stream appear straight. In select versions, the flow stream and its constituent core stream are hydrodynamically focused and are characterized by laminar flow. In some such versions, the straight edges of the core stream are substantially parallel to one another (e.g., such as where the edges deviate from true parallel lines by five degrees or less, such as two degrees or less). In some instances, an intact core stream is not characterized by perturbations from the distal end of the sample injection needle to the distal end of the flow cell. In some such instances, the intact core stream does not include eddies (e.g., surrounding the tip of the sample injection needle). In certain cases, the subject flow cytometers and their constituent sample injection needles reduce flow stream and core stream perturbations as compared to conventional instruments by 20% or more, by 25% or more, by 30% or more, by 40% or more, by 45% or more, by 50% or more, by 55% or more, by 60% or more, by 65% or more, by 70% or more, by 75% or more, by 80% or more, by 85% or more, by 90% or more, by 95% or more, by 99% or more, and including by 100%.

As discussed about, the subject sample injection needles are configured and positioned to maintain an intact core stream under flow conditions that vary by a magnitude or more. The term "magnitude"—also referred to as an "order of magnitude"—is used in its conventional sense to refer to flow conditions that differ by a factor of ten or more. In certain cases, the subject sample injection needles are configured and positioned to maintain an intact core stream under flow conditions that vary by two magnitudes or more. The flow conditions discussed herein may include, for example, a sheath fluid flow rate, a sample fluid flow rate, particle size (e.g., diameter), pressure (either positive or negative), and the like. In some embodiments, the subject sample injection needles are configured and positioned to maintain an intact core stream under sheath fluid flow rates that vary by a magnitude or more. For example, in some instances, the sample injection needle is configured and positioned to maintain an intact core stream under the condition that the flow rate of the flow stream ranges from m/s to 10 m/s. In select instances, the subject sample injection needles are configured and positioned to maintain an intact core stream under sample fluid flow rates that vary by a magnitude or more. For example, in some cases, he sample injection needle is configured and positioned to maintain an intact core stream under the condition that the flow rate of the sample fluid ranges from 1 μl/min to 150 μl/min.

As discussed herein, the "flow cell" is described in its conventional sense to refer to a component containing a flow channel configured to accommodate a liquid flow stream for transporting particles in a sheath fluid. In embodiments, the subject flow cell includes a cuvette. Cuvettes of interest include containers having a passage running therethrough. Flow cells of interest include a light-accessible flow channel. In some instances, the flow cell includes transparent material (e.g., quartz) that permits the passage of light therethrough. Any convenient flow cell which propagates a fluidic sample to a sample interrogation region may be employed as the flow cell described herein, where in some embodiments, the flow cell includes is a cylindrical flow cell, a frustoconical flow cell or a flow cell that includes a proximal cylindrical portion defining a longitudinal axis and a distal frustoconical portion which terminates in a flat surface having the orifice that is transverse to the longitudinal axis. Flow cells of interest have a proximal end that receives fluid from a sample fluid source (i.e., via the sample injection needle) and a sheath fluid source and a distal end for emitting fluid. Depending on the configuration of the flow cytometer, fluid at the distal end of the flow cell may be directed to one or more different types of collection vessels.

In some cases, the flow stream is configured for irradiation with light from a light source at an interrogation point. The flow stream for which the flow channel is configured may include a liquid sample injected from a sample tube through a sample injection line. In certain embodiments, the flow stream may include a narrow, rapidly flowing stream of liquid that is arranged such that linearly segregated particles transported therein are separated from each other in a single-file manner. The "interrogation point" discussed herein refers to a region within the flow cell in which the particle is irradiated by light from the light source, e.g., for analysis. The size of the interrogation point may vary as desired. For example, where 0 μm represents the axis of light emitted by the light source, the interrogation point may range from −100 μm to 100 μm, such as −50 μm to 50 μm, such as −25 μm to 40 μm, and including −15 μm to 30 μm.

Flow cells of interest include a flow cell cone at the proximal end. A "flow cell cone" refers to a cone-shaped (e.g., right-circular cone-shaped) recess in the flow cell that narrows towards the analysis region (i.e., interrogation zone) of the flow cell. Flow cells cones may play a role in hydrodynamically focusing the flow stream. The flow cell cone described herein may be characterized by an angle (i.e. measured with respect to an imaginary axis running through the center of the cone to a generatrix line of the cone) ranging from 15° to 25°, such as 18° to 22°, such as 19° to 21°. In some cases, the flow cell cone described herein may be characterized by an angle of 20°.

In certain embodiments, the flow cytometer includes a sample fluid source. The sample fluid source may be any suitable reservoir or container (e.g., having rigid or flexible walls) for holding a sample fluid. The sample fluid container may have a volume ranging from 1 mL to 100 mL; for example, the volume of the container may range from 1 mL to 90 mL, from 1 mL to 80 mL, from 1 mL to 70 mL, from 1 mL to 60 mL, from 1 mL to 50 mL, from 1 mL to 40 mL, from 1 mL to 30 mL, from 1 mL to 20 mL, or from 1 mL to 10 mL. In embodiments, sample fluid is provided from the sample fluid source to the sample injection needle via a sample injection line (e.g., tubing).

In some embodiments, the flow cytometer includes a sheath fluid reservoir. The sheath fluid reservoir many be any suitable reservoir or container (e.g., having rigid or flexible walls) for holding sheath fluid. In certain embodiments, the sheath fluid reservoir is fluidically coupled to the input of the flow cell. The sheath fluid container may have a volume ranging from 1 L to 100 L; for example, the volume of the container may range from 1 L to 90 L, from 1 L to 80 L, from 1 L to 70 L, from 1 L to 60 L, from 1 L to 50 L, from 1 L to 40 L, from 1 L to 30 L, from 1 L to 20 L, or from 1 L to 10 L. The sheath fluid reservoir may be fluidically connected to a sheath fluid line that is configured to convey sheath fluid from the reservoir to the flow cell.

Flow cytometers of interest may further include one or more sheath fluid introduction ports. The subject sheath fluid introduction ports are fluidically connected to the sheath fluid source (i.e., reservoir) and provide sheath fluid to the flow cell at the proximal end. In embodiments, a sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber may be 25 μL/sec to 2500 μL/sec, such as 50 μL/sec to 1000 μL/sec, and including 75 μL/sec or more to 750 μL/sec.

In some embodiments, the sheath fluid injection port is an orifice positioned in a wall of the inner chamber. The sheath fluid injection port orifice may be any suitable shape where cross-sectional shapes of interest include, but are not limited to rectilinear cross-sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some cases, the one or more sheath fluid introduction ports are located in the flow cell cone (i.e., at the "base" of the cone). In some instances, flow cytometers include a single sheath fluid introduction port. In other instances, flow cytometers include a plurality of sheath fluid introduction ports. The number of sheath fluid ports in the plurality of sheath fluid ports may vary, and include, for example, 2 sheath fluid introduction ports, 3 sheath fluid introduction ports, 4 sheath fluid introduction ports and sheath fluid introduction ports. In select versions, the flow cytometer comprises 2 sheath fluid introduction ports. In some instances where flow cytometers of the invention include a plurality of sheath fluid introduction ports, the plurality of sheath fluid introduction ports are offset from one another such that the sheath fluid swirls through the flow cell cone (e.g., in a "toilet bowl" manner). In some such instances, the plurality of sheath fluid introduction ports are offset from one another such that the sheath fluid swirls in a clockwise direction. In other instances, the plurality of sheath fluid introduction ports are offset from one another such that the sheath fluid swirls in a counterclockwise direction. In certain cases, the swirling of the sheath fluid provides further flow stream and core stream stability.

Sample injection needles of the disclosure may include an elongate structure. By "elongate structure" it is meant that the sample injection needle possesses a greater length than width. In other words, the sample injection needle possesses a distinct proximal and distal end. The proximal end is the end at which the sample injection needle receives sample fluid (i.e., from a sample injection line fluidically connected to a sample fluid source), and the distal end is the end at which the sample injection needle injects sample into the flow cell. The elongate structure may have any convenient cross-sectional shape, where cross-sectional shapes of interest include, but are not limited to rectilinear cross-sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In embodiments, the elongate structure possesses a substantially circular cross-sectional shape at locations along the length. By "substantially" circular cross-section, it is meant that, in embodiments, one or more locations along the length of the outlet fitting may have a cross-section that slightly deviates from a circular cross-section that characterizes the remainder of the structure. For example, in some versions, the elongate structure has a polygonal (e.g., hexagonal, pentagonal, etc.) cross-section at one or more locations along the length. In certain cases, the width (e.g., cross-sectional diameter) of the elongate structure changes along the length of the outlet fitting. Put another way, in such versions, the elongate structure is not a perfect cylinder and instead possesses some regions having a cross-sectional shape with a diameter that is larger or smaller than those of other regions. In other cases, every portion of the sample injection needle has a circular cross section. In some such cases, different portions of the sample injection needle may be characterized by different diameters. In some cases, at least a portion of the sample injection needle has an outer diameter (i.e., measured from the geometric center of the sample injection needle to the outer edges) ranging from 0.5 mm to 4 mm, such as 0.75 mm to 3 mm, such as 1 mm to 2 mm, such as 1.25 mm to 1.75 mm, and including 1.5 mm to 1.6 mm. In some cases, the sample injection needle includes an outer diameter of 1.562 mm. The sample injection needle may have any convenient length, where lengths of interest range from 15 mm to 30 mm, such as 17 mm to 26 mm, and including 20 mm to 22 mm. In certain cases, the sample injection needle does not flatten at the distal end, e.g., creating a "duck billed" shape. In these cases, the sample injection needle may have a substantially circular cross section throughout.

In some cases, the sample injection needle comprises a taper at the distal end. In some such cases, the sample injection needle has a relatively constant outer diameter throughout the majority of its length (i.e., starting at the proximal end), but the outer diameter gradually (e.g., evenly) lessens when approaching the distal end. In certain embodiments, the sample injection needle includes a taper range of 2.5 mm-12 mm radius across a length of 1.75 mm-4 mm. For example, in some versions, the sample injection needle includes a taper range of a taper range of 2.79 mm-11.63 mm radius across a length of 1.78 mm-3.81 mm. The taper may begin at different locations along the length of the sample injection needle. In some cases, the taper begins at a location along the length of the sample injection needle that is separated from the distal end by a distance ranging from 3 mm to 5 mm, such as 3.5 mm to 4.0 mm, and including 3.8 mm to 3.9 mm. Such a distal end may, in some cases, be referred to as having a "super bullet" configuration. In some embodiments having a super bullet configuration, the distal end has a taper range of 11.63 mm radius across a length of 3.81 mm. In other cases, the taper begins at a location along the length of the sample injection needle that is separated from the distal end by a distance ranging from 1 mm to 3 mm, such as 1.5 mm to 2 mm, and including 1.7 mm to 1.8 mm. Such a distal end may, in some cases, be referred to as having a "bullet" configuration. In some embodiments where the sample injection needle has a bullet configuration, the distal end has a taper range of 2.79 mm radius across a length of 1.78 mm. In other cases, the sample injection needle includes a rounded distal end.

Sample injection needles of the invention also include an opening at the distal end and a channel running therethrough for conveying sample fluid—optionally containing particles—to the flow cell. In embodiments, the opening is located at the geometric center of the cross-section of the outlet fitting at the distal end. The opening may have any convenient cross-sectional shape, where cross-sectional shapes of interest include, but are not limited to rectilinear cross-sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain cases, the opening has a circular cross-sectional shape. In additional cases, the channel similarly includes a circular cross-sectional shape. The opening may have any suitable diameter, such as where the diameter ranges from 0.1 mm to 2 mm, such as 0.1 to 1 mm, such as 0.2 mm to 0.4 mm, and including 0.25 mm to 0.30 mm. Similarly, the channel may have any suitable diameter, such as where the diameter ranges from 0.1 mm to 2 mm, such as 0.1 to 1 mm, such as mm to 0.4 mm, and including 0.25 mm to 0.30 mm. In some cases, the opening and the channel possess a circular cross-sectional shape having the same or similar diameter. In other cases, the opening has a diameter that is different (e.g., larger) than the diameter of the channel.

In some cases, the sample injection needle includes an adapter at the proximal end. The adapter may, in certain instances, be used to anchor the sample injection needle within the flow cytometer. In some such instances, the adapter includes one or more holes configured to receive a fastening member (e.g., pins, screws, etc.). In select versions, the adapter includes a plurality of holes configured to receive a fastening member. In certain embodiments, the adapter includes three holes. In additional cases, the adapter may be configured to fluidically connect to a sample injection line to provide sample fluid (optionally containing particles) to the sample injection needle.

Figure 1A:
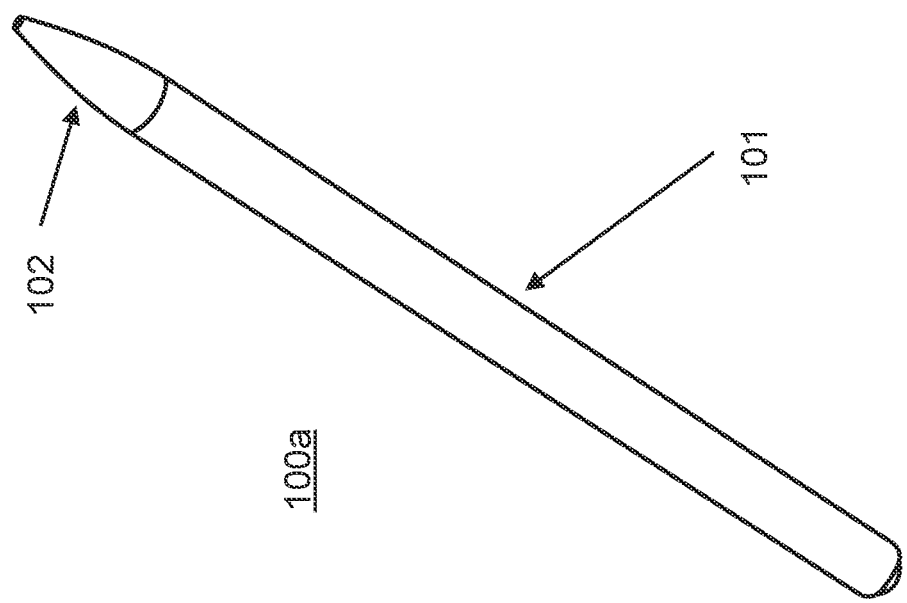

FIG. 1A-1C provide alternate depictions of sample injection needles according to certain embodiments of the invention. As shown in FIG. 1A, sample injection needle 100a includes elongate structure 101 and a taper 102 at the distal end. FIG. 1B provides an example of a sample injection needle having an adapter. As shown in FIG. 1B, sample injection needle 100b includes elongate structure 101, taper 102 at the distal end, and adapter 103. The adapter 103 includes a plurality of holes 105 for receiving a fastening member (e.g., a screw; not shown) for attaching the sample injection needle to a flow cell. FIG. 1C provides a sectional view of a sample injection needle according to certain embodiments of the invention. As shown in section A-A of sample injection needle 100c, channel 104 is visible running through the center of the needle. The elongate structure 101 and taper 102 at the distal end are also shown.

Figure 2B:
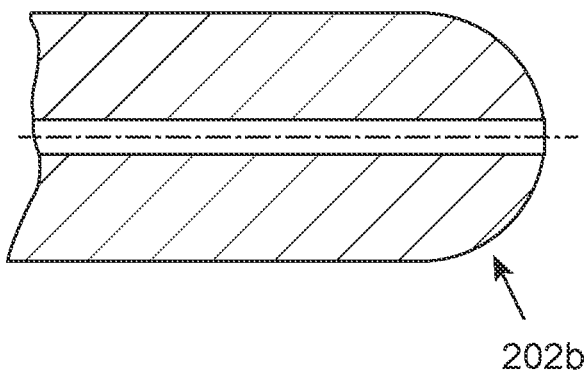
Figure 2C:
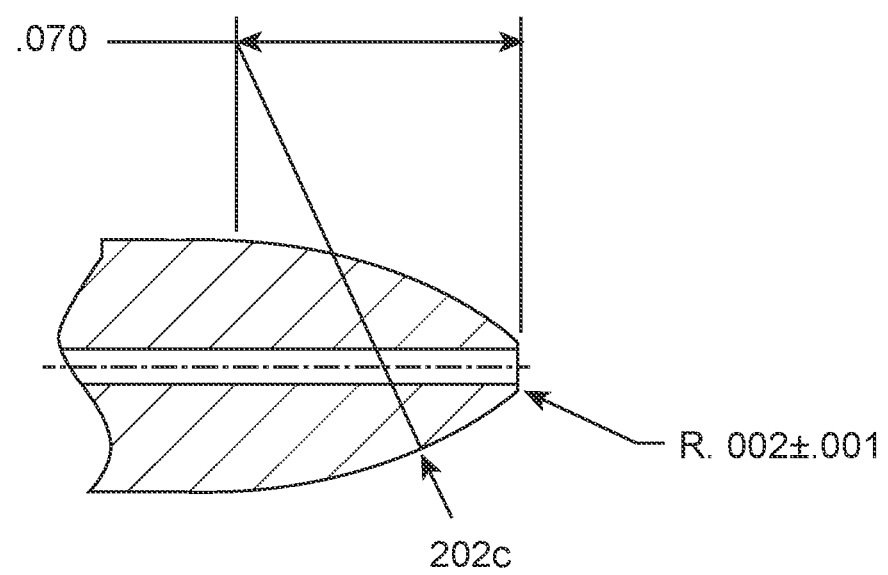

FIG. 2A-2C present illustrations of the distal ends of sample injection needles according to certain embodiments of the invention. The exemplary dimensions presented in FIG. 2A-2C are shown in inches. FIG. 2A shows a sample injection needle distal end 202a having the super bullet configuration discussed above. FIG. 2B depicts a sample injection needle distal end 202b having a rounded distal end. FIG. 2C depicts a sample injection needle distal end 202c having the bullet configuration discussed above.

The sample injection needles of the invention are positioned with respect to the flow cell in a particular manner. The positioning of the sample injection needle with respect to the flow cell may be described in multiple ways. For example, in certain instances, the positioning of the sample injection needle is described with respect to the location of the distal end with respect to the one or more sheath fluid introduction ports. For example, in some cases, the distal end of the sample injection needle is positioned within the flow cell cone and is separated from the sheath fluid introduction point by a longitudinal distance ranging from 15 mm to 30 mm, such as 17 mm to 26 mm, and including 20 mm to 22 mm. The positioning of the sample injection needle may also be described with respect to the location of the distal end relative to the interrogation point (i.e., the point at which the flow cell is irradiated by one or more light sources). In some cases, the distal end of the sample injection needle is separated from the interrogation point by a distance ranging from 10 mm to 20 mm, such as 13 mm to 17 mm, and including 14 to 16 mm.

Figure 3A:
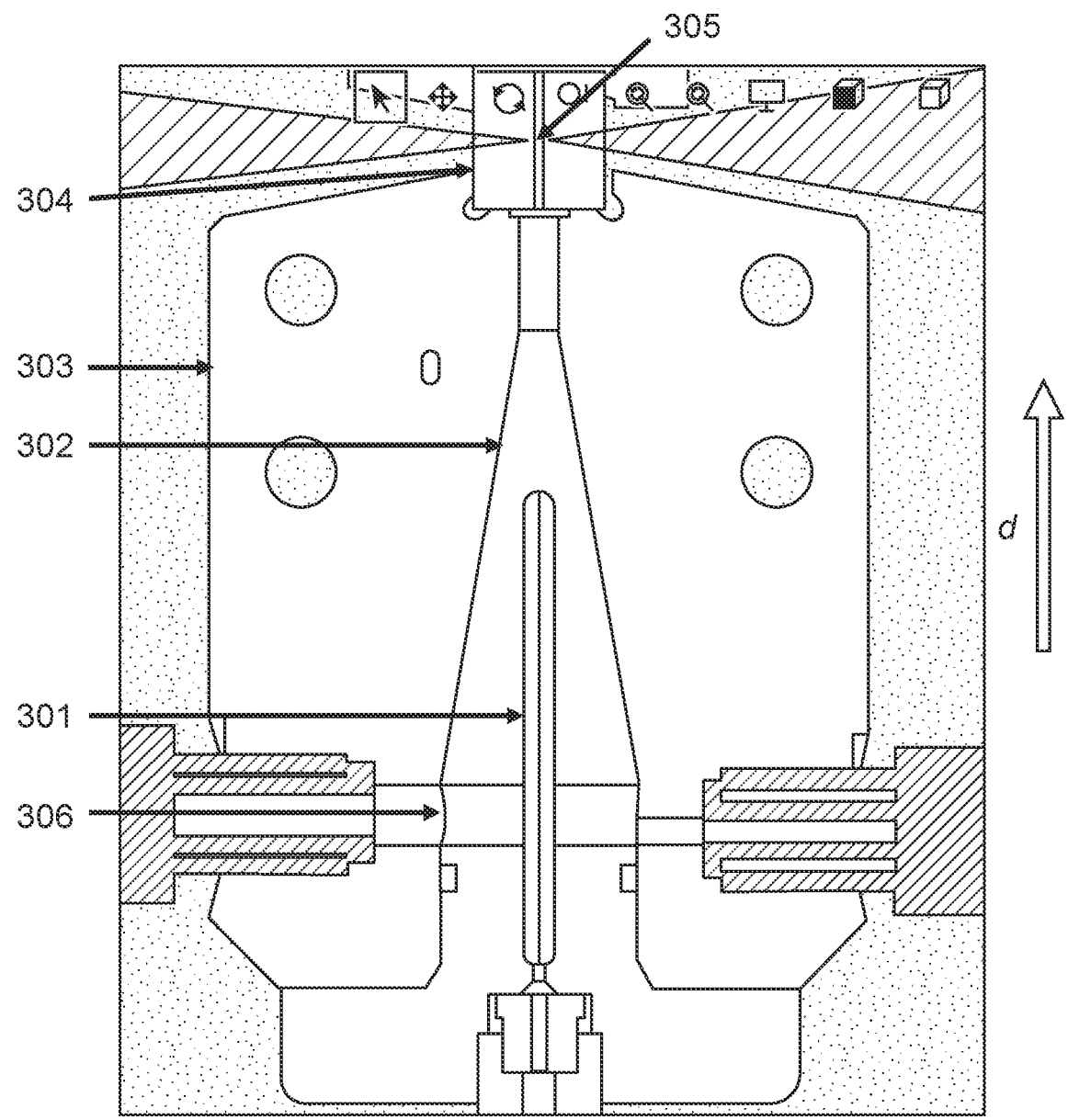
FIG. 3A-3B depict a flow cell and sample injection needle according to certain embodiments of the invention.
Figure 3B:
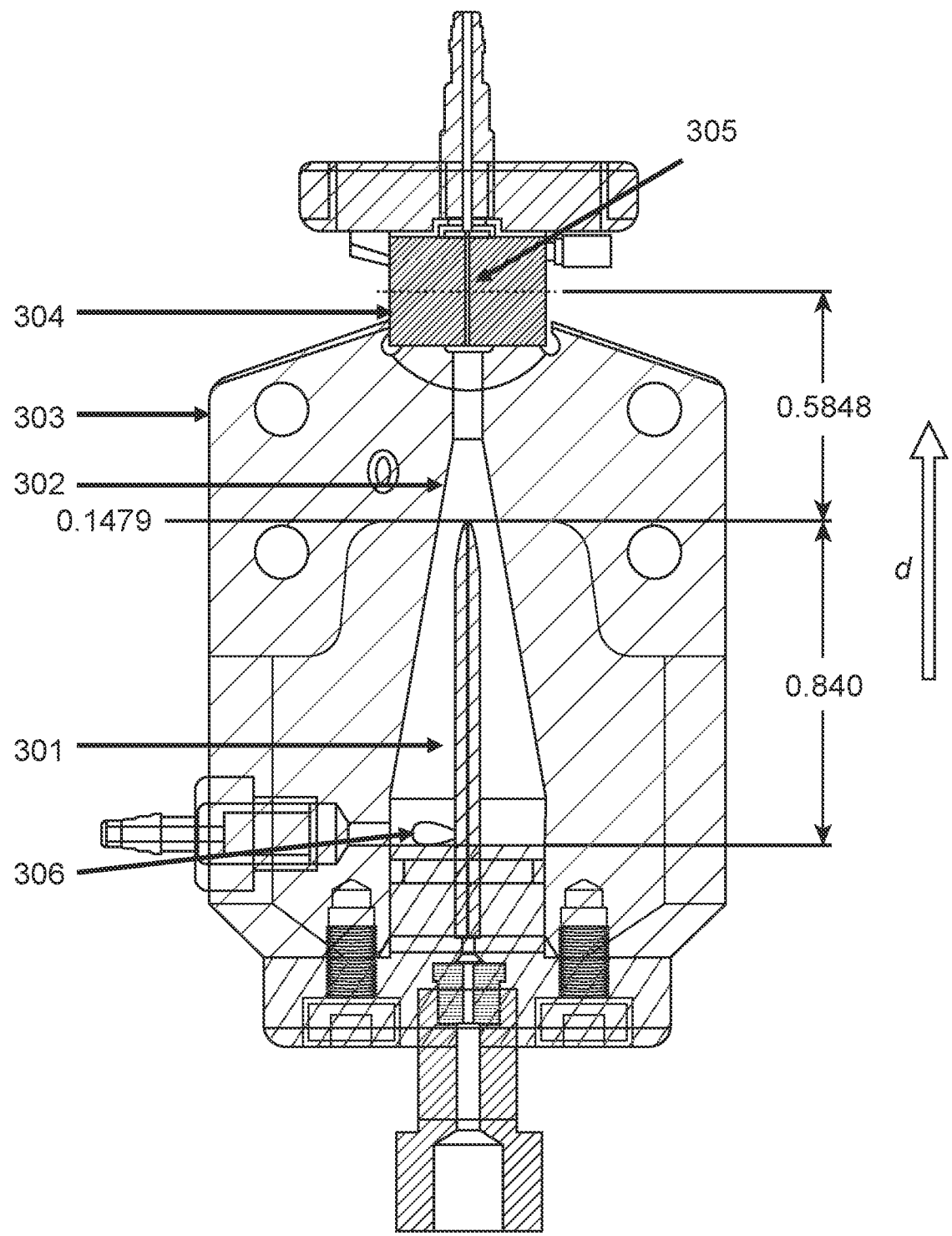

FIG. 3A-3B depict a flow cell and sample injection needle according to certain embodiments of the invention. As shown in FIG. 3A, flow cell 303 includes flow cell cone 302 and cuvette 304. Lasers (not shown) irradiate cuvette 304 at irradiation point 305. A sheath fluid introduction port 306 is configured to provide sheath fluid to flow cell cone 302, and sample injection needle 301 is configured to provide sample fluid to flow cell cone 302 in such a way that the core stream (not shown) remains intact over flow conditions that vary by a magnitude or more. The sheath fluid and sample fluid proceed through the flow cell in direction d. FIG. 3B provides an alternate depiction of the same elements provided in FIG. 3A. As shown in the exemplary embodiment of FIG. 3B, the distal end of sample injection needle 301 is separated from sheath fluid injection port 306 by 0.840 in (21.3 mm). In addition, the distal end of sample injection needle 301 is separated from irradiation point 305 by 0.5848 in (14.85 mm).

After particles are irradiated in the flow cell, particle-modulated light may be observed. By "particle-modulated light" it is meant light that is received from the particles in the flow stream following the irradiation of the particles with light from the light source. In some cases, the particle-modulated light is side-scattered light. As discussed herein, side-scattered light refers to light refracted and reflected from the surfaces and internal structures of the particle. In additional embodiments, the particle-modulated light includes forward-scattered light (i.e., light that travels through or around the particle in mostly a forward direction). In still other cases, the particle-modulated light includes fluorescent light (i.e., light emitted from a fluorochrome following irradiation with excitation wavelength light).

As discussed above, aspects of the invention also include a light source configured to irradiate particles passing through the flow cell at an interrogation point. Any convenient light source may be employed as the light source described herein. In some embodiments, the light source is a laser. In embodiments, the laser may be any convenient laser, such as a continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chloride (XeCl) excimer laser or xenon-fluorine (XeF) excimer laser or a combination thereof. In other instances, the subject flow cytometers include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject flow cytometers include a solid-state laser, such as a ruby laser, an Nd:YAG laser, NdCrYAG laser, Er:YAG laser, Nd:YLF laser, Nd:YVO4 laser, $Nd:YCa_4O(BO_3)_3$ laser, Nd:YCOB laser, titanium sapphire laser, thulim YAG laser, ytterbium YAG laser, ytterbium$_2O_3$ laser or cerium doped lasers and combinations thereof.

Laser light sources according to certain embodiments may also include one or more optical adjustment components. In certain embodiments, the optical adjustment component is located between the light source and the flow cell, and may include any device that is capable of changing the spatial width of irradiation or some other characteristic of irradiation from the light source, such as for example, irradiation direction, wavelength, beam width, beam intensity and focal spot. Optical adjustment protocols may include any convenient device which adjusts one or more characteristics of the light source, including but not limited to lenses, mirrors, filters, fiber optics, wavelength separators, pinholes, slits, collimating protocols and combinations thereof. In certain embodiments, flow cytometers of interest include one or more focusing lenses. The focusing lens, in one example, may be a de-magnifying lens. In still other embodiments, flow cytometers of interest include fiber optics.

Where the optical adjustment component is configured to move, the optical adjustment component may be configured to be moved continuously or in discrete intervals, such as for example in 0.01 µm or greater increments, such as 0.05 µm or greater, such as 0.1 µm or greater, such as 0.5 µm or greater such as 1 µm or greater, such as 10 µm or greater, such as 100 µm or greater, such as 500 µm or greater, such as 1 mm or greater, such as 5 mm or greater, such as 10 mm or greater and including mm or greater increments.

Any displacement protocol may be employed to move the optical adjustment component structures, such as coupled to a moveable support stage or directly with a motor actuated translation stage, leadscrew translation assembly, geared translation device, such as those employing a stepper motor, servo motor, brushless electric motor, brushed DC motor, micro-step drive motor, high resolution stepper motor, among other types of motors.

The light source may be positioned any suitable distance from the flow cell, such as where the light source and the flow cell are separated by 0.005 mm or more, such as mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. In addition, the light source may be positioned at any suitable angle relative to the flow cell, such as at an angle ranging from 10 degrees to 90 degrees, such as from 15 degrees to 85 degrees, such as from 20 degrees to 80 degrees, such as from 25 degrees to 75 degrees and including from 30 degrees to 60 degrees, for example at a 90 degree angle.

In some embodiments, light sources of interest include a plurality of lasers configured to provide laser light for discrete irradiation of the flow stream, such as 2 lasers or more, such as 3 lasers or more, such as 4 lasers or more, such as 5 lasers or more, such as 10 lasers or more, and including 15 lasers or more configured to provide laser light for discrete irradiation of the flow stream. Depending on the desired wavelengths of light for irradiating the flow stream, each laser may have a specific wavelength that varies from 200 nm to 1500 nm, such as from 250 nm to 1250 nm, such as from 300 nm to 1000 nm, such as from 350 nm to 900 nm and including from 400 nm to 800 nm. In certain embodiments, lasers of interest may include one or more of a 405 nm laser, a 488 nm laser, a 561 nm laser and a 635 nm laser.

As discussed above, flow cytometers of interest may further include one or more particle-modulated light detectors for detecting particle-modulated light intensity data. In some embodiments, the particle-modulated light detector(s) include one or more forward-scattered light detectors configured to detect forward-scattered light. For example, the subject flow cytometers may include 1 forward-scattered light detector or multiple forward-scattered light detectors, such as 2 or more, such as 3 or more, such as 4 or more, and including 5 or more. In certain embodiments, flow cytometers include 1 forward-scattered light detector. In other embodiments, flow cytometers include 2 forward-scattered light detectors.

Any convenient detector for detecting collected light may be used in the forward-scattered light detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from 0.1 cm$^2$ to 8 cm$^2$, such as from 0.5 cm$^2$ to 7 cm$^2$ and including from 1 cm$^2$ to 5 cm$^2$.

In embodiments, the forward-scattered light detector is configured to measure light continuously or in discrete intervals. In some instances, detectors of interest are configured to take measurements of the collected light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In additional embodiments, the one or more particle-modulated light detector(s) may include one or more side-scattered light detectors for detecting side-scatter wavelengths of light (i.e., light refracted and reflected from the surfaces and internal structures of the particle). In some embodiments, flow cytometers include a single side-scattered light detector. In other embodiments, flow cytometers include multiple side-scattered light detectors, such as 2 or more, such as 3 or more, such as 4 or more, and including 5 or more.

Any convenient detector for detecting collected light may be used in the side-scattered light detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from 0.1 cm$^2$ to 8 cm$^2$, such as from cm$^2$ to 7 cm$^2$ and including from 1 cm$^2$ to 5 cm$^2$.

In embodiments, the subject flow cytometers also include a fluorescent light detector configured to detect one or more fluorescent wavelengths of light. In other embodiments, flow cytometers include multiple fluorescent light detectors such as 2 or more, such as 3 or more, such as 4 or more, 5 or more, 10 or more, 15 or more, and including 20 or more.

Any convenient detector for detecting collected light may be used in the zs fluorescent light detector described herein. Detectors of interest may include, but are not limited to, optical sensors or detectors, such as active-pixel sensors (APSs), avalanche photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes (PMTs), phototransistors, quantum dot photoconductors or photodiodes and combinations thereof, among other detectors. In certain embodiments, the collected light is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the detector is a photomultiplier tube, such as a photomultiplier tube having an active detecting surface area of each region that ranges from 0.01 cm$^2$ to 10 cm$^2$, such as from 0.05 cm$^2$ to 9 cm$^2$, such as from, such as from 0.1 cm$^2$ to 8 cm$^2$, such as from 0.5 cm$^2$ to 7 cm$^2$ and including from 1 cm$^2$ to cm$^2$.

Where the subject flow cytometers include multiple fluorescent light detectors, each fluorescent light detector may be the same, or the collection of fluorescent light detectors may be a combination of different types of detectors. For example, where the subject flow cytometers include two fluorescent light detectors, in some embodiments the first fluorescent light detector is a CCD-type device and the second fluorescent light detector (or imaging sensor) is a CMOS-type device. In other embodiments, both the first and second fluorescent light detectors are CCD-type devices. In yet other embodiments, both the first and second fluorescent light detectors are CMOS-type devices. In still other embodiments, the first fluorescent light detector is a CCD-type device and the second fluorescent light detector is a photomultiplier tube (PMT). In still other embodiments, the first fluorescent light detector is a CMOS-type device and the second fluorescent light detector is a photomultiplier tube. In yet other embodiments, both the first and second fluorescent light detectors are photomultiplier tubes.

In embodiments of the present disclosure, fluorescent light detectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths. In some embodiments, 2 or more detectors in the flow cytometers as described herein are configured to measure the same or overlapping wavelengths of collected light.

In some embodiments, fluorescent light detectors of interest are configured to measure collected light over a range of wavelengths (e.g., 200 nm-1000 nm). In certain embodiments, detectors of interest are configured to collect spectra of light over a range of wavelengths. For example, flow cytometers may include one or more detectors configured to collect spectra of light over one or more of the wavelength ranges of 200 nm-1000 nm. In yet other embodiments, detectors of interest are configured to measure light emitted by a sample in the flow stream at one or more specific wavelengths. For example, flow cytometers may include one or more detectors configured to measure light at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, one or more detectors may be configured to be paired with specific fluorophores, such as those used with the sample in a fluorescence assay.

In some embodiments, flow cytometers include one or more wavelength separators positioned between the flow cell and the particle-modulated light detector(s). The term "wavelength separator" is used herein in its conventional sense to refer to an optical component that is configured to separate light collected from the sample into predetermined spectral ranges. In some embodiments, flow cytometers include a single wavelength separator. In other embodiments, flow cytometers include a plurality of wavelength separators, such as 2 or more wavelength separators, such as 3 or more, such as 4 or more, such as 5 or more, such as 6 or more, such as 7 or more, such as 8 or more, such as 9 or more, such as 10 or more, such as 15 or more, such as 25 or more, such as 50 or more, such as 75 or more and including 100 or more wavelength separators. In some embodiments, the wavelength separator is configured to separate light collected from the sample into predetermined spectral ranges by passing light having a predetermined spectral range and reflecting one or more remaining spectral ranges of light. In other embodiments, the wavelength separator is configured to separate light collected from the sample into predetermined spectral ranges by passing light having a predetermined spectral range and absorbing one or more remaining spectral ranges of light. In yet other embodiments, the wavelength separator is configured to spatially diffract light collected from the sample into predetermined spectral ranges. Each wavelength separator may be any convenient light separation protocol, such as one or more dichroic mirrors, bandpass filters, diffraction gratings, beam splitters or prisms. In some embodiments, the wavelength separator is a prism. In other embodiments, the wavelength separator is a diffraction grating. In certain embodiments, wavelength separators in the subject light detection systems are dichroic mirrors.

Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem*. January; 49(pt 1):17-28; Linden, et. al., *Semin Throm Hemost*. 2004 October; 30(5): 502-11; Alison, et al. *J Pathol,* 2010 December; 222(4):335-344; and Herbig, et al. (2007) *Crit Rev Ther Drug Carrier Syst.* 24(3):203-255; the disclosures of which are incorporated herein by reference. In certain instances, flow cytometry systems of interest include BD Biosciences FACSCanto™ flow cytometer, BD Biosciences FACSCanto™ II flow cytometer, BD Accuri™ flow cytometer, BD Accuri™ C6 Plus flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer, BD Biosciences LSRFortessa™ flow cytometer, BD Biosciences LSRFortessa™ X-20 flow cytometer, BD Biosciences FACSPresto™ flow cytometer, BD Biosciences FACSVia™ flow cytometer and BD Biosciences FACSCalibur™ cell sorter, a BD Biosciences FACSCount™ cell sorter, BD Biosciences FACSLyric™ cell sorter, BD Biosciences Via™ cell sorter, BD Biosciences Influx™ cell sorter, BD Biosciences Jazz™ cell sorter, BD Biosciences Aria™ cell sorter, BD Biosciences FACSAria™ II cell sorter, BD Biosciences FACSAria™ III cell sorter, BD Biosciences FACSAria™ Fusion cell sorter and BD Biosciences FACSMelody™ cell sorter, BD Biosciences FACSymphony™ S6 cell sorter or the like.

In some embodiments, the subject systems are flow cytometric systems, such those described in U.S. Pat. Nos. 10,663,476; 10,620,111; 10,613,017; 10,605,713; 10,578, 542; 10,578,469; 10,481,074; 10,302,545; 10,145,793; 10,113,967; 9,952,076; 9,933,341; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,627,040; 5,620,842; 5,602,039; 4,987,086; 4,498,766; the disclosures of which are herein incorporated by reference in their entirety.

In certain instances, flow cytometry systems of the invention are configured for imaging particles in a flow stream by fluorescence imaging using radiofrequency tagged emission (FIRE), such as those described in Diebold, et al. Nature Photonics Vol. 7(10); 806-810 (2013) as well as described in U.S. Pat. Nos. 9,423,353; 9,784,661; 9,983,132; 10,006,852; 10,078,045; 10,036,699; 10,222,316; 10,288,546; 10,324,019; 10,451,538; 10,620,111; and U.S. Patent Publication Nos. 2017/0133857; 2017/0328826; 2017/0350803; 2018/0275042; 2019/0376895 and 2019/0376894 the disclosures of which are herein incorporated by reference.

FIG. 4 shows a system 400 for flow cytometry in accordance with an illustrative embodiment of the present invention. The system 400 includes a flow cytometer 410, a controller/processor 490 and a memory 495. The flow cytometer 410 includes one or more excitation lasers 415*a*-415*c*, a focusing lens 420, a flow chamber 425, a forward-scatter detector 430, a side-scatter detector 435, a fluorescence collection lens 440, one or more beam splitters 445*a*-445*g*, one or more bandpass filters 450*a*-450*e*, one or more longpass ("LP") filters 455*a*-455*b*, and one or more fluorescent detectors 460*a*-460*f*.

The excitation lasers 415*a-c* emit light in the form of a laser beam. The wavelengths of the laser beams emitted from excitation lasers 415*a*-415*c* are 488 nm, 633 nm, and 325 nm, respectively, in the example system of FIG. 4. The laser beams are first directed through one or more of beam splitters 445*a* and 445*b*. Beam splitter 445*a* transmits light at 488 nm and reflects light at 633 nm. Beam splitter 445*b* transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward-scatter detector 430, the side-scatter detector 435, and the one or more fluorescent detectors 460*a*-460*f* through one or more of the beam splitters 445*c*-445*g*, the bandpass filters 450*a*-450*e*, the longpass filters 455*a*-455*b*, and the fluorescence collection lens 440.

The fluorescence collection lens 440 collects light emitted from the particle-laser beam interaction and routes that light towards one or more beam splitters and filters. Bandpass filters, such as bandpass filters 450*a*-450*e*, allow a narrow range of wavelengths to pass through the filter. For example, bandpass filter 450*a* is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455a-455b, transmit wavelengths of light equal to or longer than a specified wavelength of light. For example, longpass filter 455b, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

The forward-scatter detector 430 is positioned slightly off axis from the direct beam through the flow cell and is configured to detect diffracted light, the excitation light that travels through or around the particle in mostly a forward direction. The intensity of the light detected by the forward-scatter detector is dependent on the overall size of the particle. The forward-scatter detector can include a photodiode. The side-scatter detector 435 is configured to detect refracted and reflected light from the surfaces and internal structures of the particle that tends to increase with increasing particle complexity of structure. The fluorescence emissions from fluorescent molecules associated with the particle can be detected by the one or more fluorescent detectors 460a-460f. The side-scatter detector 435 and fluorescent detectors can include photomultiplier tubes. The signals detected at the forward-scatter detector 430, the side-scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 490 is coupled to the detectors to receive the output signals therefrom, and may also be coupled to electrical and electromechanical components of the flow cytometer 410 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 410. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4 includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules in a fluorochrome panel used for a flow cytometer experiment will emit light in their own characteristic wavelength bands. The particular fluorescent labels used for an experiment and their associated fluorescent emission bands may be selected to generally coincide with the filter windows of the detectors. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

In some embodiments, the subject systems are particle sorting systems that are configured to sort particles with an enclosed particle sorting module, such as those described in U.S. Patent Publication No. 2017/0299493, filed on Mar. 28, 2017, the disclosure of which is incorporated herein by reference. In certain embodiments, particles (e.g., cells) of the sample are sorted using a sort decision module having a plurality of sort decision units, such as those described in U.S. Patent Publication No. 2020/0256781, filed on Dec. 23, 2019, the disclosure of which is incorporated herein by reference. In some embodiments, systems for sorting components of a sample include a particle sorting module having deflection plates, such as described in U.S. Patent Publication No. 2017/0299493, filed on Mar. 28, 2017, the disclosure of which is incorporated herein by reference.

FIG. 5 shows a functional block diagram for one example of a control system, such as a processor 500, for analyzing and displaying biological events. A processor 500 can be configured to implement a variety of processes for controlling graphic display of biological events.

A flow cytometer or sorting system 502 can be configured to acquire biological event data. For example, a flow cytometer can generate flow cytometric event data (e.g., particle-modulated light data). The flow cytometer 502 can be configured to provide biological event data to the processor 500. A data communication channel can be included between the flow cytometer 502 and the processor 500. The biological event data can be provided to the processor 500 via the data communication channel.

The processor 500 can be configured to receive biological event data from the flow cytometer 502. The biological event data received from the flow cytometer 502 can include flow cytometric event data. The processor 500 can be configured to provide a graphical display including a first plot of biological event data to a display device 506. The processor 500 can be further configured to render a region of interest as a gate around a population of biological event data shown by the display device 506, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The processor 500 can be further configured to display the biological event data on the display device 506 within the gate differently from other events in the biological event data outside of the gate. For example, the processor 500 can be configured to render the color of biological event data contained within the gate to be distinct from the color of biological event data outside of the gate. The display device 506 can be implemented as a monitor, a tablet computer, a smartphone, or other electronic device configured to present graphical interfaces.

The processor 500 can be configured to receive a gate selection signal identifying the gate from a first input device. For example, the first input device can be implemented as a mouse 510. The mouse 510 can initiate a gate selection signal to the processor 500 identifying the gate to be displayed on or manipulated via the display device 506 (e.g., by clicking on or in the desired gate when the cursor is positioned there). In some implementations, the first device can be implemented as the keyboard 508 or other means for providing an input signal to the processor 500 such as a touchscreen, a stylus, an optical detector, or a voice recognition system. Some input devices can include multiple inputting functions. In such implementations, the inputting functions can each be considered an input device. For example, as shown in FIG. 5, the mouse 510 can include a right mouse button and a left mouse button, each of which can generate a triggering event.

The triggering event can cause the processor 500 to alter the manner in which the data is displayed, which portions of the data is actually displayed on the display device 506, and/or provide input to further processing such as selection of a population of interest for particle sorting.

In some embodiments, the processor 500 can be configured to detect when gate selection is initiated by the mouse 510. The processor 500 can be further configured to automatically modify plot visualization to facilitate the gating process. The modification can be based on the specific distribution of biological event data received by the processor 500. In some embodiments, the processor 500 expands the first gate such that a second gate is generated (e.g., as discussed above).

The processor 500 can be connected to a storage device 504. The storage device 504 can be configured to receive and store biological event data from the processor 500. The storage device 504 can also be configured to receive and store flow cytometric event data from the processor 500. The storage device 504 can be further configured to allow retrieval of biological event data, such as flow cytometric event data, by the processor 500.

The display device 506 can be configured to receive display data from the processor 500. The display data can comprise plots of biological event data and gates outlining sections of the plots. The display device 506 can be further configured to alter the information presented according to input received from the processor 500 in conjunction with input from the flow cytometer 502, the storage device 504, the keyboard 508, and/or the mouse 510.

In some implementations the processor 500 can generate a user interface to receive example events for sorting. For example, the user interface can include a mechanism for receiving example events or example images. The example events or images or an example gate can be provided prior to collection of event data for a sample or based on an initial set of events for a portion of the sample.

Figure 6A:
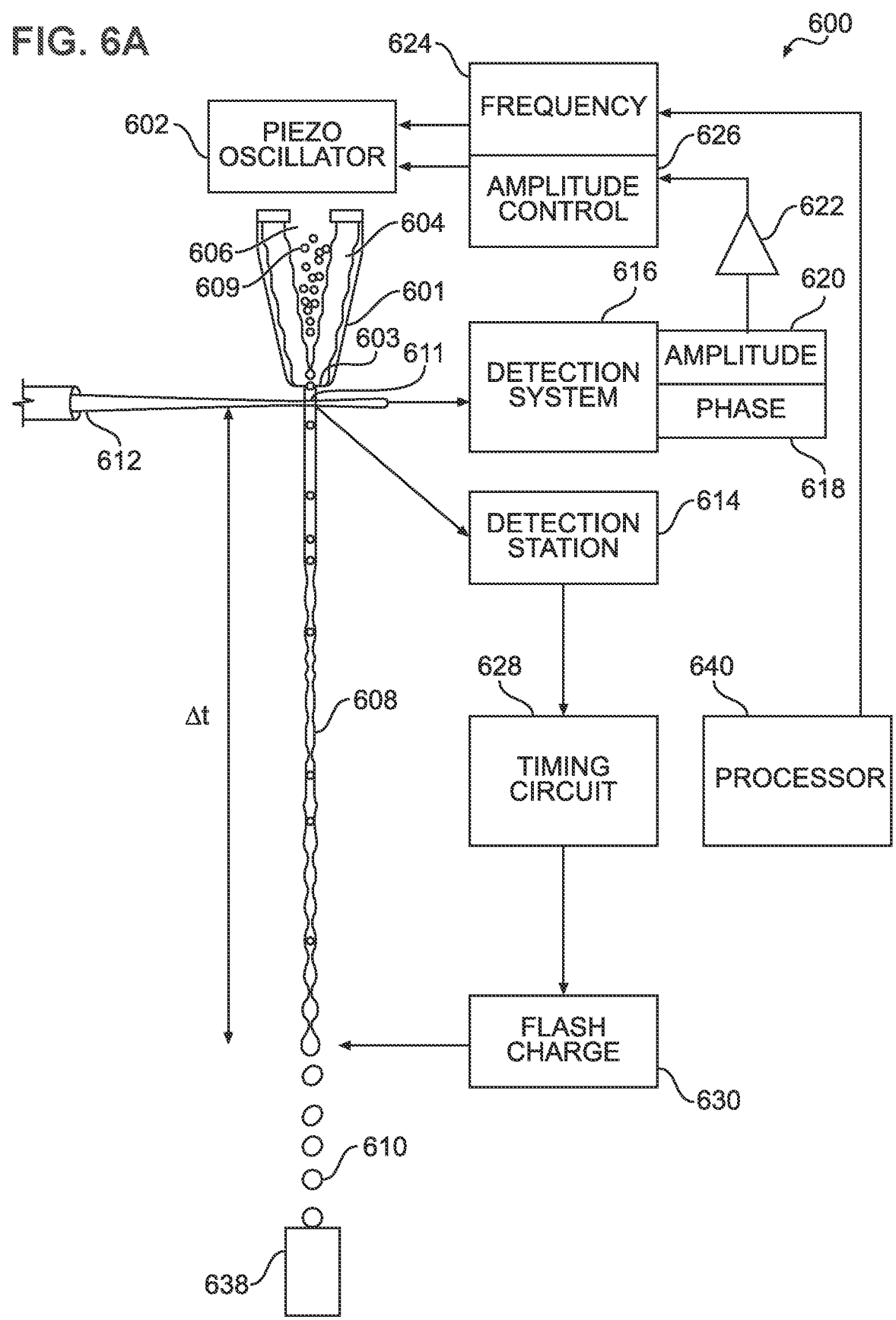
FIG. 6A-6B depicts a schematic drawing of a particle sorter system according to certain embodiments.

FIG. 6A is a schematic drawing of a particle sorter system 600 (e.g., the flow cytometer 502) in accordance with one embodiment presented herein. In some embodiments, the particle sorter system 600 is a cell sorter system. As shown in FIG. 6A, a drop formation transducer 602 (e.g., piezo-oscillator) is coupled to a fluid conduit 601, which can be coupled to, can include, or can be, a nozzle 603. Within the fluid conduit 601, sheath fluid 604 hydrodynamically focuses a sample fluid 606 comprising particles 609 into a moving fluid column 608 (e.g., a stream). Within the moving fluid column 608, particles 609 (e.g., cells) are lined up in single file to cross a monitored area 611 (e.g., where laser-stream intersect), irradiated by an irradiation source 612 (e.g., a laser). Vibration of the drop formation transducer 602 causes moving fluid column 608 to break into a plurality of drops 610, some of which contain particles 609.

In operation, a detection station 614 (e.g., an event detector) identifies when a particle of interest (or cell of interest) crosses the monitored area 611. Detection station 614 feeds into a timing circuit 628, which in turn feeds into a flash charge circuit 630. At a drop break off point, informed by a timed drop delay (Δt), a flash charge can be applied to the moving fluid column 608 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 6A, the drops can be collected in a drain receptacle 638.

A detection system 616 (e.g., a drop boundary detector) serves to automatically determine the phase of a drop drive signal when a particle of interest passes the monitored area 611. An exemplary drop boundary detector is described in U.S. Pat. No. 7,679,039, which is incorporated herein by reference in its entirety. The detection system 616 allows the instrument to accurately calculate the place of each detected particle in a drop. The detection system 616 can feed into an amplitude signal 620 and/or phase 618 signal, which in turn feeds (via amplifier 622) into an amplitude control circuit 626 and/or frequency control circuit 624. The amplitude control circuit 626 and/or frequency control circuit 624, in turn, controls the drop formation transducer 602. The amplitude control circuit 626 and/or frequency control circuit 624 can be included in a control system.

In some implementations, sort electronics (e.g., the detection system 616, the detection station 614 and a processor 640) can be coupled with a memory configured to store the detected events and a sort decision based thereon. The sort decision can be included in the event data for a particle. In some implementations, the detection system 616 and the detection station 614 can be implemented as a single detection unit or communicatively coupled such that an event measurement can be collected by one of the detection system 616 or the detection station 614 and provided to the non-collecting element.

Figure 6B:
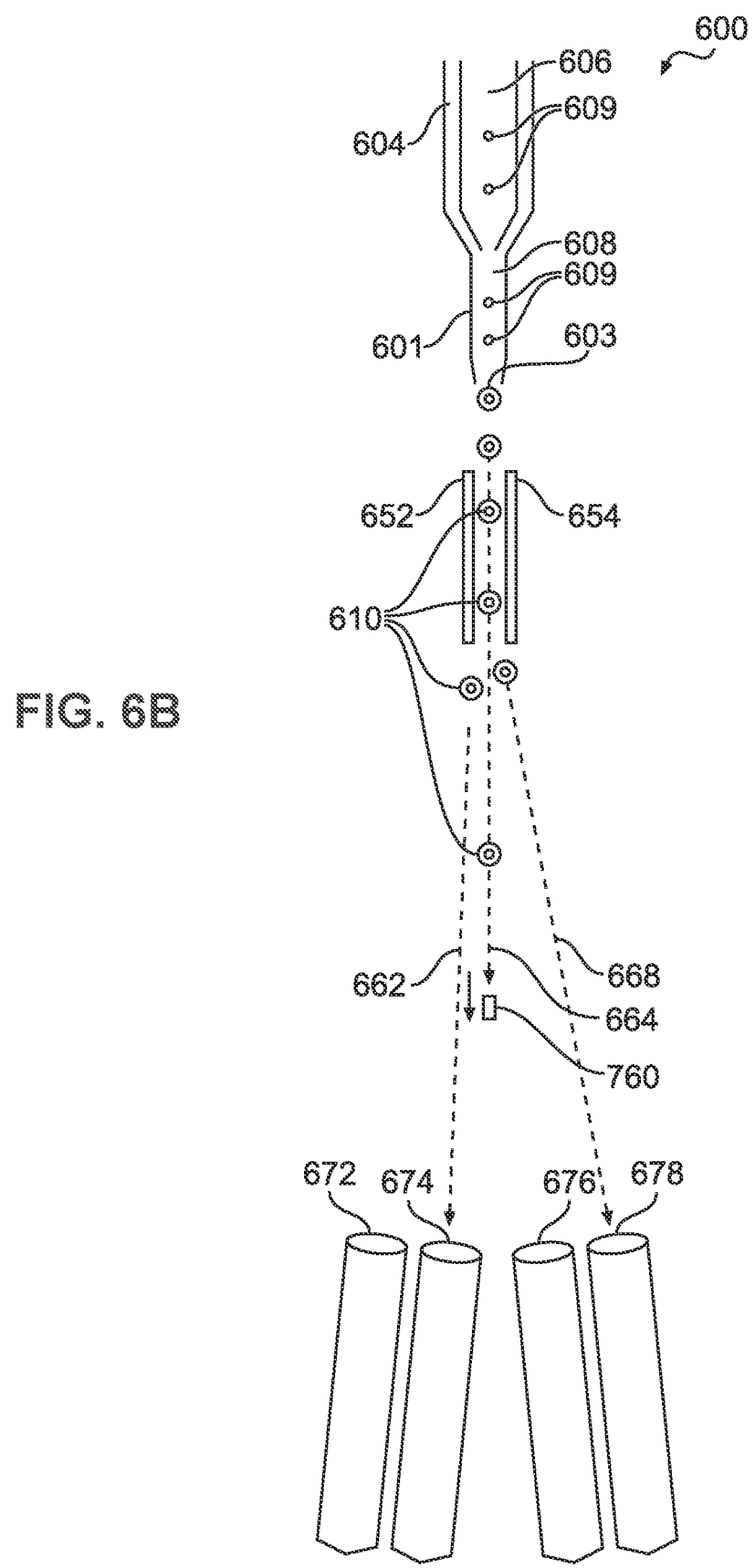

FIG. 6B is a schematic drawing of a particle sorter system, in accordance with one embodiment presented herein. The particle sorter system 600 shown in FIG. 6B, includes deflection plates 652 and 654. A charge can be applied via a stream-charging wire in a barb. This creates a stream of droplets 610 containing particles 609 for analysis. The particles can be illuminated with one or more light sources (e.g., lasers) to generate light scatter and fluorescence information. The information for a particle is analyzed such as by sorting electronics or other detection system (not shown in FIG. 6B). The deflection plates 652 and 654 can be independently controlled to attract or repel the charged droplet to guide the droplet toward a destination collection vessel (e.g., one of 672, 674, 676, or 678). As shown in FIG. 6B, the deflection plates 652 and 654 can be controlled to direct a particle along a first path 662 toward the vessel 674 or along a second path 668 toward the vessel 678. If the particle is not of interest (e.g., does not exhibit scatter or illumination information within a specified sort range), deflection plates may allow the particle to continue along a flow path 664. Such uncharged droplets may pass into a waste receptacle such as via aspirator 670.

The sorting electronics can be included to initiate collection of measurements, receive fluorescence signals for particles, and determine how to adjust the deflection plates to cause sorting of the particles. Example implementations of the embodiment shown in FIG. 6B include the BD FACSAria™ line of flow cytometers commercially provided by Becton, Dickinson and Company (Franklin Lakes, NJ).

Methods of Analyzing a Sample

As discussed above, aspects of the invention also include methods of analyzing a sample. Methods of interest include introducing a particulate sample into a flow cytometer described above, and flow cytometrically sorting the particulate sample. As discussed, the subject flow cytometers include a flow cell for transporting particles in a core stream of a flow stream from a proximal end to a distal end, and a sample injection needle having a passage running therethrough for delivering sample fluid from a sample injection line at a proximal end to the flow cell at a distal end to generate the core stream. Flow cells of interest include a flow cell cone at the proximal end, and sample injection needles of interest are configured and positioned to maintain an intact core stream under flow conditions that vary by a magnitude or more.

In some instances, the sample analyzed in the instant methods is a biological sample. The term "biological sample" is used in its conventional sense to refer to a whole organism, plant, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to a homogenate, lysate or extract prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class Mammalia, including the orders carnivore (e.g., dogs and cats), Rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While the present invention may be applied to samples from a human subject, it is to be understood that the methods may also be carried-out on samples from other animal subjects (that is, in "non-human subjects") such as, but not limited to, birds, mice, rats, dogs, cats, livestock and horses.

Cells of interest may be targeted for characterized according to a variety of parameters, such as a phenotypic characteristic identified via the attachment of a particular fluorescent label to cells of interest. In some embodiments, the system is configured to deflect analyzed droplets that are determined to include a target cell. A variety of cells may be characterized using the subject methods. Target cells of interest include, but are not limited to, stem cells, T cells, dendritic cells, B Cells, granulocytes, leukemia cells, lymphoma cells, virus cells (e.g., HIV cells), NK cells, macrophages, monocytes, fibroblasts, epithelial cells, endothelial cells, and erythroid cells. Target cells of interest include cells that have a convenient cell surface marker or antigen that may be captured or labelled by a convenient affinity agent or conjugate thereof. For example, the target cell may include a cell surface antigen such as CD11 b, CD123, CD14, CD15, CD16, CD19, CD193, CD2, CD25, CD27, CD3, CD335, CD36, CD4, CD43, CD45RO, CD56, CD61, CD7, CD8, CD34, CD1c, CD23, CD304, CD235a, T cell receptor alpha/beta, T cell receptor gamma/delta, CD253, CD95, CD20, CD105, CD117, CD120b, Notch4, Lgr5 (N-Terminal), SSEA-3, TRA-1-60 Antigen, Disialoganglioside GD2 and CD71. In some embodiments, the target cell is selected from HIV containing cell, a Treg cell, an antigen-specific T-cell populations, tumor cells or hematopoietic progenitor cells (CD34+) from whole blood, bone marrow or cord blood.

In practicing the subject methods, an amount of an initial fluidic sample is injected into the flow cytometer. The amount of sample injected into the particle sorting module may vary, for example, ranging from 0.001 mL to 1000 mL, such as from 0.005 mL to 900 mL, such as from 0.01 mL to 800 mL, such as from 0.05 mL to 700 mL, such as from 0.1 mL to 600 mL, such as from 0.5 mL to 500 mL, such as from 1 mL to 400 mL, such as from 2 mL to 300 mL and including from 5 mL to 100 mL of sample.

Methods according to embodiments of the present disclosure include counting and optionally sorting labeled particles (e.g., target cells) in a sample. In practicing the subject methods, the fluidic sample including the particles is first introduced into a flow nozzle of the system. Upon exit from the flow nozzle, the particles are passed substantially one at a time through the sample interrogation region where each of the particles is irradiated to a source of light and measurements of light scatter parameters and, in some instances, fluorescent emissions as desired (e.g., two or more light scatter parameters and measurements of one or more fluorescent emissions) are separately recorded for each particle. Depending on the properties of the flow stream being interrogated, 0.001 mm or more of the flow stream may be irradiated with light, such as mm or more, such as 0.01 mm or more, such as 0.05 mm or more, such as 0.1 mm or more, such as 0.5 mm or more and including 1 mm or more of the flow stream may be irradiated with light. In certain embodiments, methods include irradiating a planar cross-section of the flow stream in the sample interrogation region, such as with a laser (as described above). In other embodiments, methods include irradiating a predetermined length of the flow stream in the sample interrogation region, such as corresponding to the irradiation profile of a diffuse laser beam or lamp.

In certain embodiments, methods including irradiating the flow stream at or near the flow cell nozzle orifice. For example, methods may include irradiating the flow stream at a position about 0.001 mm or more from the nozzle orifice, such as 0.005 mm or more, such as 0.01 mm or more, such as 0.05 mm or more, such as 0.1 mm or more, such as 0.5 mm or more and including 1 mm or more from the nozzle orifice. In certain embodiments, methods include irradiating the flow stream immediately adjacent to the flow cell nozzle orifice.

In embodiments of the method, detectors, such as photomultiplier tubes (PMT), are used to record light that passes through each particle (in certain cases referred to as forward light scatter), light that is reflected orthogonal to the direction of the flow of the particles through the sensing region (in some cases referred to as orthogonal or side light scatter) and fluorescent light emitted from the particles, if it is labeled with fluorescent marker(s), as the particle passes through the sensing region and is illuminated by the energy source. Each of forward light scatter (FSC), side-scatter (SSC), and fluorescence emissions include a separate parameter for each particle (or each "event"). Thus, for example, two, three or four parameters can be collected (and recorded) from a particle labeled with two different fluorescence markers. The data recorded for each particle is analyzed in real time or stored in a data storage and analysis means, such as a computer, as desired.

In certain embodiments, the particles are detected and uniquely identified by exposing the particles to excitation light and measuring the fluorescence of each particle in one or more detection channels, as desired. Fluorescence emitted in detection channels used to identify the particles and binding complexes associated therewith may be measured following excitation with a single light source, or may be measured separately following excitation with distinct light sources. If separate excitation light sources are used to excite the particle labels, the labels may be selected such that all the labels are excitable by each of the excitation light sources used.

Methods in certain embodiments also include data acquisition, analysis and recording, such as with a computer, wherein multiple data channels record data from each detector for the light scatter and fluorescence emitted by each particle as it passes through the sample interrogation region of the particle sorting module. In these embodiments, analysis includes classifying and counting particles such that each particle is present as a set of digitized parameter values. The subject systems may be set to trigger on a selected parameter in order to distinguish the particles of interest from background and noise. "Trigger" refers to a preset threshold for detection of a parameter and may be used as a means for detecting passage of a particle through the light source. Detection of an event that exceeds the threshold for the selected parameter triggers acquisition of light scatter and fluorescence data for the particle. Data is not acquired for particles or other components in the medium being assayed which cause a response below the threshold. The trigger parameter may be the detection of forward-scattered light caused by passage of a particle through the light beam. The flow cytometer then detects and collects the light scatter and fluorescence data for the particle.

A particular subpopulation of interest is then further analyzed by "gating" based on the data collected for the entire population. To select an appropriate gate, the data is plotted so as to obtain the best separation of subpopulations possible. This procedure may be performed by plotting forward light scatter (FSC) vs. side (i.e., orthogonal) light scatter (SSC) on a two dimensional dot plot. A subpopulation of particles is then selected (i.e., those cells within the gate) and particles that are not within the gate are excluded. Where desired, the gate may be selected by drawing a line around the desired subpopulation using a cursor on a computer screen. Only those particles within the gate are then further analyzed by plotting the other parameters for these particles, such as fluorescence. Where desired, the above analysis may be configured to yield counts of the particles of interest in the sample.

Methods of interest may further include employing particles in research, laboratory testing, or therapy. In some embodiments, the subject methods include obtaining individual cells prepared from a target fluidic or tissue biological sample. For example, the subject methods include obtaining cells from fluidic or tissue samples to be used as a research or diagnostic specimen for diseases such as cancer. Likewise, the subject methods include obtaining cells from fluidic or tissue samples to be used in therapy. A cell therapy protocol is a protocol in which viable cellular material including, e.g., cells and tissues, may be prepared and introduced into a subject as a therapeutic treatment. Conditions that may be treated by the administration of the flow cytometrically sorted sample include, but are not limited to, blood disorders, immune system disorders, organ damage, etc.

A typical cell therapy protocol may include the following steps: sample collection, cell isolation, genetic modification, culture, and expansion in vitro, cell harvesting, sample volume reduction and washing, bio-preservation, storage, and introduction of cells into a subject. The protocol may begin with the collection of viable cells and tissues from source tissues of a subject to produce a sample of cells and/or tissues. The sample may be collected via any suitable procedure that includes, e.g., administering a cell mobilizing agent to a subject, drawing blood from a subject, removing bone marrow from a subject, etc. After collecting the sample, cell enrichment may occur via several methods including, e.g., centrifugation based methods, filter based methods, elutriation, magnetic separation methods, fluorescence-activated cell sorting (FACS), and the like. In some cases, the enriched cells may be genetically modified by any convenient method, e.g., nuclease mediated gene editing. The genetically modified cells can be cultured, activated, and expanded in vitro. In some cases, the cells are preserved, e.g., cryopreserved, and stored for future use where the cells are thawed and then administered to a patient, e.g., the cells may be infused in the patient.

Methods of Assembling a Flow Cytometer

As discussed above, aspects of the invention also include methods of assembling a flow cytometer. Methods of interest include positioning a sample injection needle within a flow cytometer. Suitable flow cytometers include a flow cell for transporting particles in a core stream of a flow stream from a proximal end to a distal end. The subject flow cells include a flow cell cone at the proximal end. Methods include positioning the sample injection needle within the flow cell cone such that an intact core stream is maintained under flow conditions that vary by a magnitude or more. As discussed, the sample injection needle has a passage running therethrough for delivering sample fluid from a sample injection line at a proximal end to the flow cell at a distal end to generate the core stream.

In embodiments, methods include positioning the distal end of the sample injection needle within the flow cell cone such that the distal end of the sample injection needle is separated from the sheath fluid introduction point by a longitudinal distance ranging from 17 mm to 26 mm. For example, in some cases, methods include positioning the distal end of the sample injection needle within the flow cell cone such that the distal end of the sample injection needle is separated from the sheath fluid introduction point by a longitudinal distance ranging from 20 mm to 22 mm. In select instances, the method comprises positioning the sample injection needle within the flow cell cone such that distal end of the sample injection needle is separated from the interrogation point by a distance ranging from 13 mm to 17 mm (e.g., from 14 mm to 16 mm).

Computer-Controlled Systems

Aspects of the invention additionally include computer-controlled systems, where the systems include one or more computers for complete automation or partial automation. In some embodiments, systems include a computer having a non-transitory computer readable storage medium with a computer program stored thereon, where the computer program when loaded on the computer includes instructions for receiving a target or desired flow conditions (e.g., sheath fluid flow rate, sample fluid flow rate), and initiating a resistance state change to achieve the target or desired flow conditions. Because systems described herein include a flow cell and sample injection needle of the invention, the resulting core stream may remain intact.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor, or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, Python, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, or a diskette drive. Such types of memory storage devices typically read from, and/or write to, a program storage medium (not shown) such as a compact disk. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, Wi-Fi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, a USB-C port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or Wi-Fi connection to the internet at a Wi-Fi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a workstation, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows® NT®, Windows® XP, Windows® 7, Windows® 8, Windows® 10, iOS®, macOS®, Linux®, Ubuntu®, Fedora®, OS/400®, i5/OS®, IBM i®, Android rm, SGI IRIX®, Oracle Solaris® and others.

Figure 7:
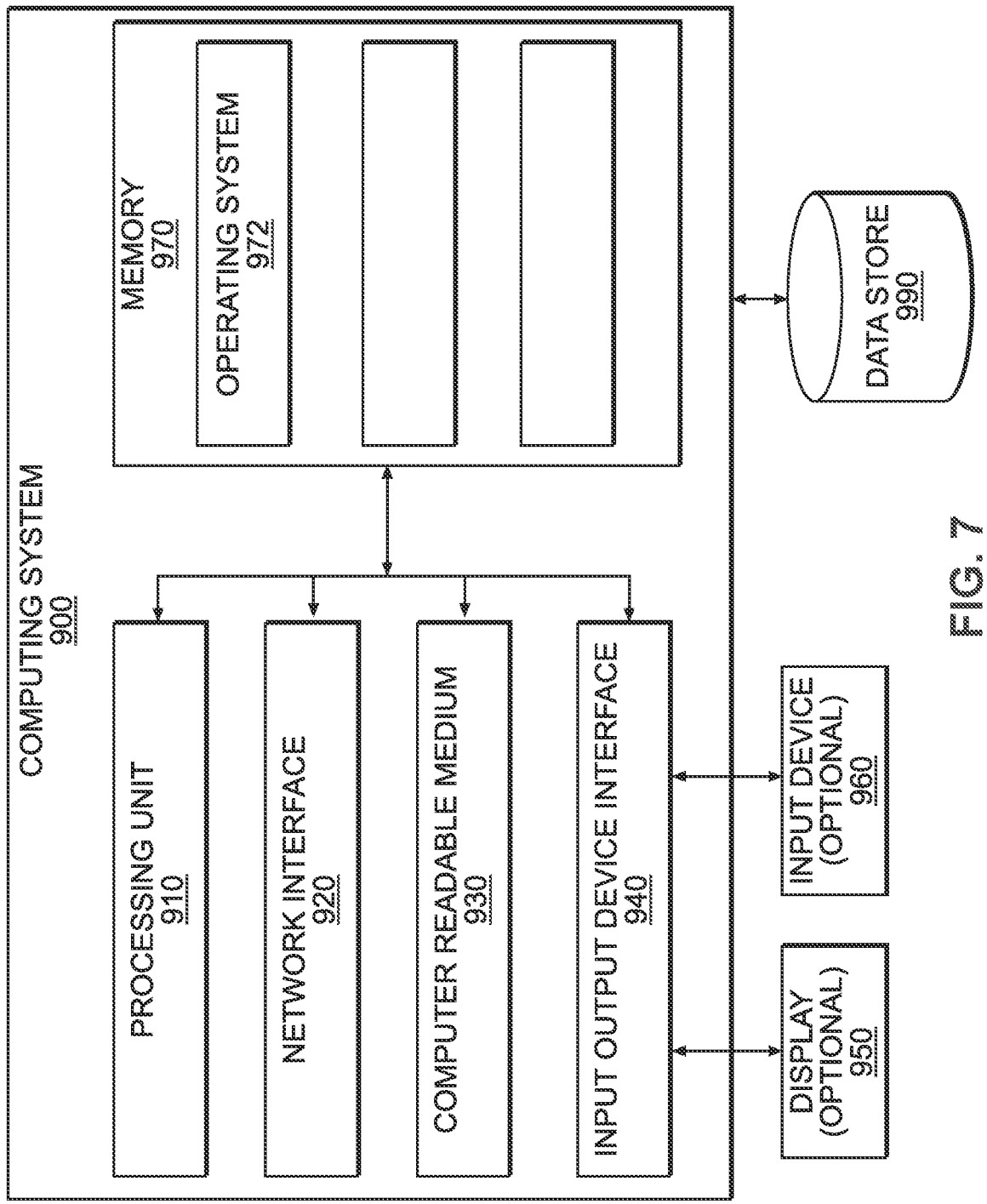
FIG. 7 depicts a block diagram of a computing system according to certain embodiments.

FIG. 7 depicts a general architecture of an example computing device 600 according to certain embodiments. The general architecture of the computing device 700 depicted in FIG. 7 includes an arrangement of computer hardware and software components. It is not necessary, however, that all of these generally conventional elements be shown in order to provide an enabling disclosure. As illustrated, the computing device 700 includes a processing unit 710, a network interface 720, a computer readable medium drive 730, an input/output device interface 740, a display 750, and an input device 760, all of which may communicate with one another by way of a communication bus. The network interface 720 may provide connectivity to one or more networks or computing systems. The processing unit 710 may thus receive information and instructions from other computing systems or services via a network. The processing unit 710 may also communicate to and from memory 770 and further provide output information for an optional display 750 via the input/output device interface 740. For example, an analysis software (e.g., data analysis software or program such as FlowJo®) stored as executable instructions in the non-transitory memory of the analysis system can display the flow cytometry event data to a user. The input/output device interface 740 may also accept input from the optional input device 760, such as a keyboard, mouse, digital pen, microphone, touch screen, gesture recognition system, voice recognition system, gamepad, accelerometer, gyroscope, or other input device.

The memory 770 may contain computer program instructions (grouped as modules or components in some embodiments) that the processing unit 710 executes in order to implement one or more embodiments. The memory 770 generally includes RAM, ROM and/or other persistent, auxiliary or non-transitory computer-readable media. The memory 770 may store an operating system 772 that provides computer program instructions for use by the processing unit 710 in the general administration and operation of the computing device 700. Data may be stored in data storage device 790. The memory 770 may further include computer program instructions and other information for implementing aspects of the present disclosure.

Utility

The subject sample injection needles, flow cytometers, and methods find use in a variety of applications where it is desirable to analyze components in a sample in a fluid medium. The present invention particularly finds use to improve core stream quality in fluidics systems. For example, the sample injection needles, flow cytometers, and methods may be employed to increase the extent to which the core stream remains intact. In some cases, the invention may be employed to reduce the formation of eddies within the flow cell cone.

Embodiments of the invention find use in applications where cells prepared from a biological sample may be desired for research, laboratory testing or for use in therapy. In some embodiments, the subject methods and devices may facilitate obtaining and/or analyzing individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems may facilitate obtaining cells from fluidic or tissue samples to be used in therapy.

Kits

Aspects of the present disclosure further include kits. Kits of interest include one or more sample injection needles. In one embodiments, kits include a single sample injection needle. In other embodiments, kits include a plurality of sample injection needles. Where kits include a plurality of sample injection needles, the sample injection needles may be the same or different. For example, in one instance, kits include a sample injection needle having a super bullet configuration as discussed above, a bullet configuration as discussed above, and a rounded configuration, or some combination of sample injection needles having these configurations.

In addition to the above components, the subject kits may further include (in some embodiments) instructions, e.g., for installing a sample injection needle of the invention into a flow cytometer. These instructions may be present in the subject kits in a variety of forms, one or more of which may be present in the kit. One form in which is these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

The following example is offered by way of illustration and not by way of limitation.

Experimental

Introduction

It was found from previous observation that a default injection needle (round) not extended into the flow cell is unable to establish a stable sample core at the desired sample flow speed (sheath flow at 1 m/s). Effects were more pronounced as the sample flow rate increased. This was first discovered by running diluted food dye in a flow stream. It was later confirmed by using a microscope observing a sample at the interrogation point. There were three sample flow speed options for evaluation: 8 µl/min, 32 µl/min, and 85 µl/min. At 8 µl/min the sample core had shown slight instability. At 32 µl/min, the sample core shifted around. At 85 µl/min, the sample core had failed to establish. Experimentation studying the effects of needle shape and length on sample core establishment is was consequently sought.

Methods

Figure 9A:
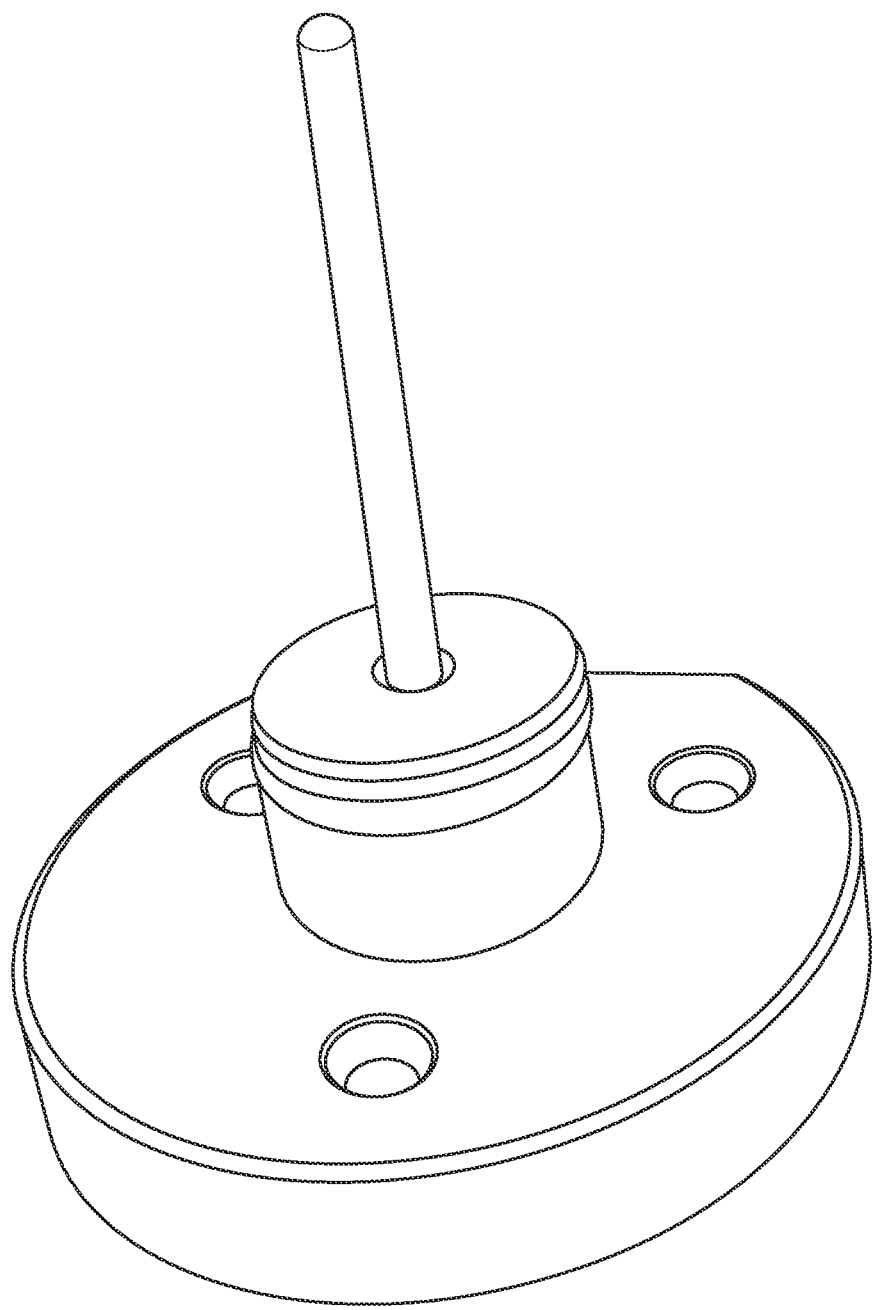
FIG. 9A-9C depict sample injection needles used to perform an analysis of needle performance.
Figure 9B:
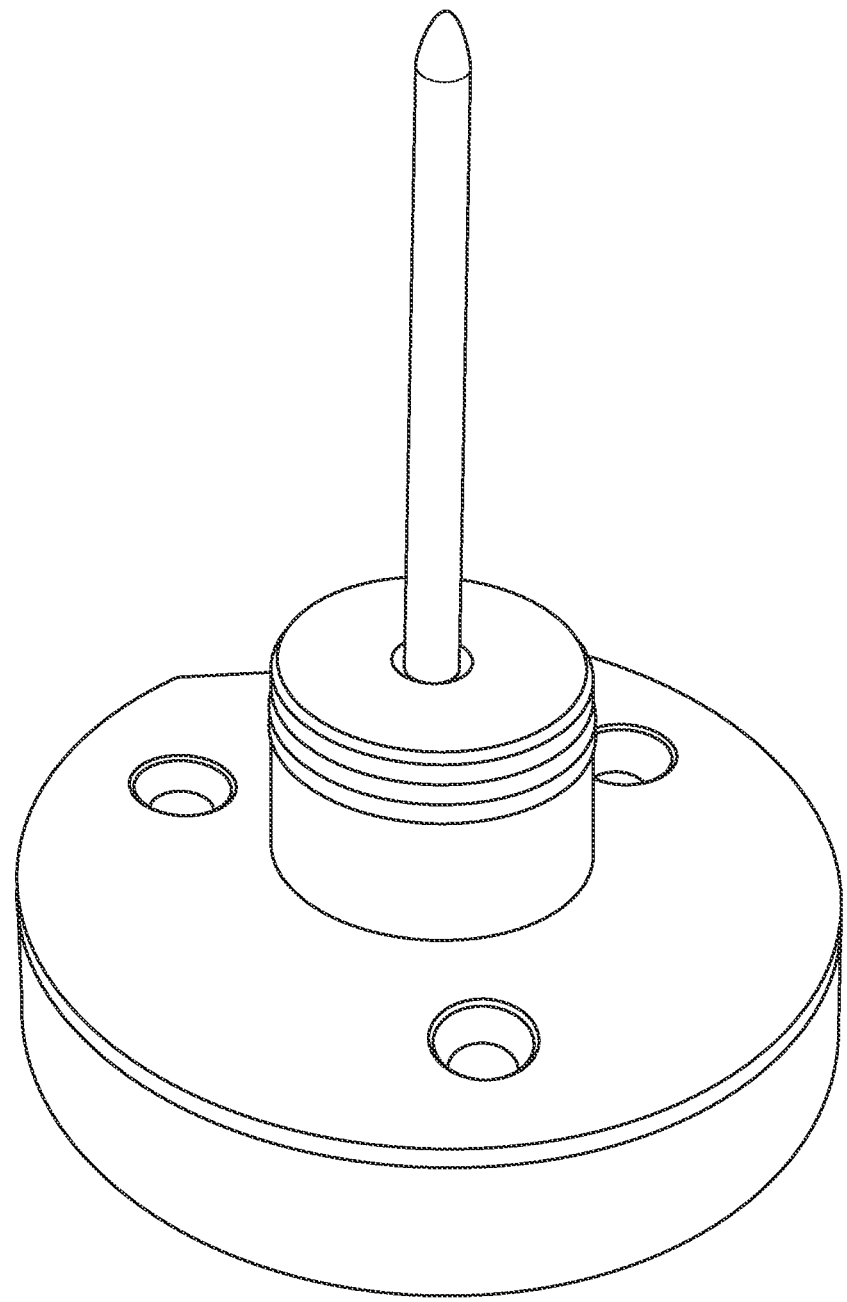
Figure 9C:
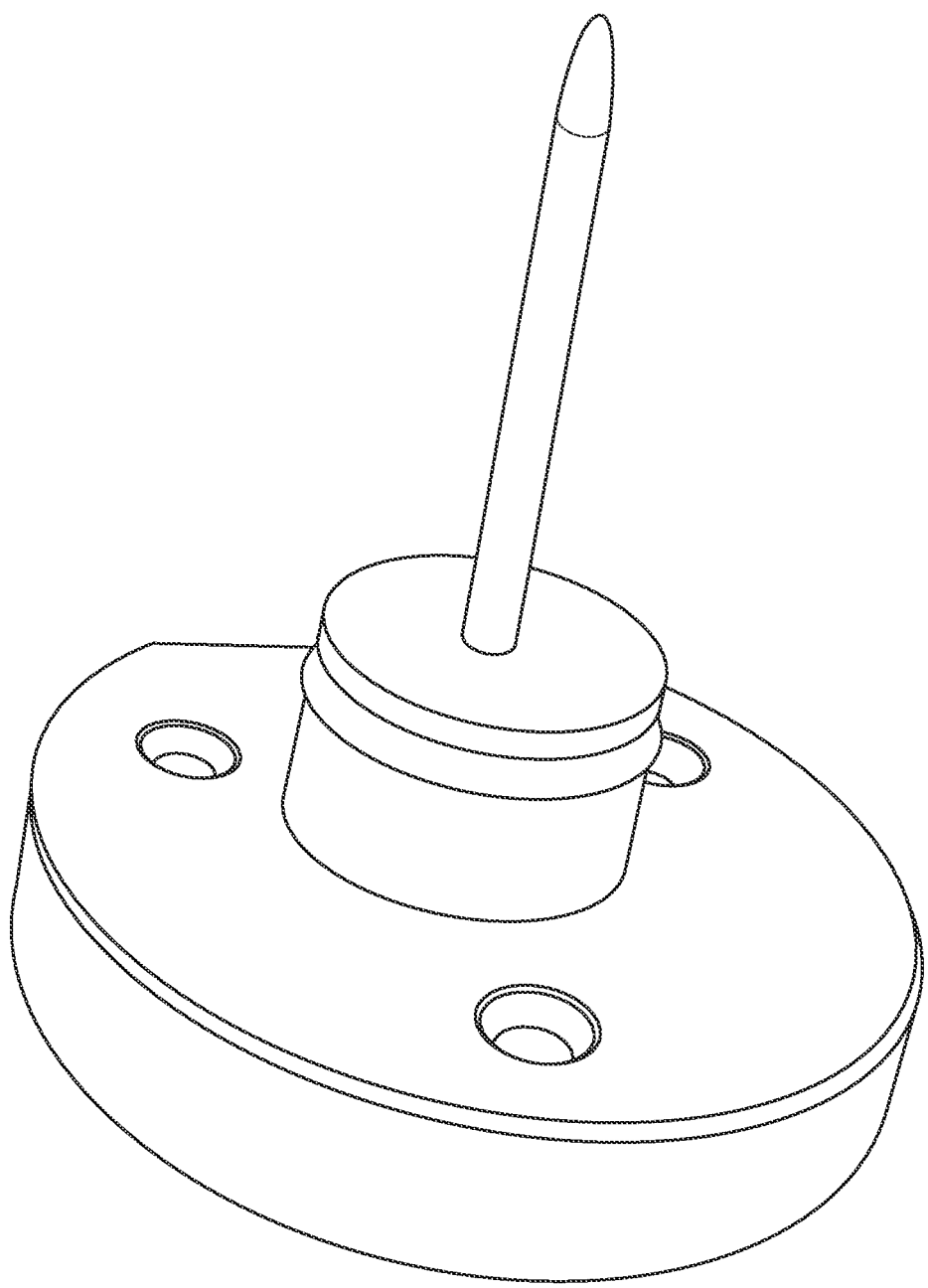

A core stream analysis was carried out on a Becton Dickinson flow cytometer using several sample injection needles at different extension positions within the flow cell. Eight needles were compared in this study. Needles were grouped by the tip shape and extension length compared to the default needle. In particular, sample injection needles having a rounded distal end (FIG. 9A), having a bullet configuration as described above (FIG. 9B), and having a superbullet configuration as described above (FIG. 9C) were compared. There are two round tip needles (a 0" extended and a ⅛" extended needle), three bullet shape needles (0", 1/16", and ⅛" extended needle), and three super bullet shape needles (0", 1/16", and ⅛" extended needle).

For each needle, three sample flow rates were applied (8, 32, and 85 µl/min). During each run, a camera was pointed at the cuvette to capture the sample core reflection. A flashlight shined light on one of the fiber cables. This created a camera-visable ring at the interrogation point. The physical center around the detection point was identified. The sample core quality was visually assessed from the video by determining if the sample core was centered and if the sample core was stable (minimum shifting).

Results

Figure 8:
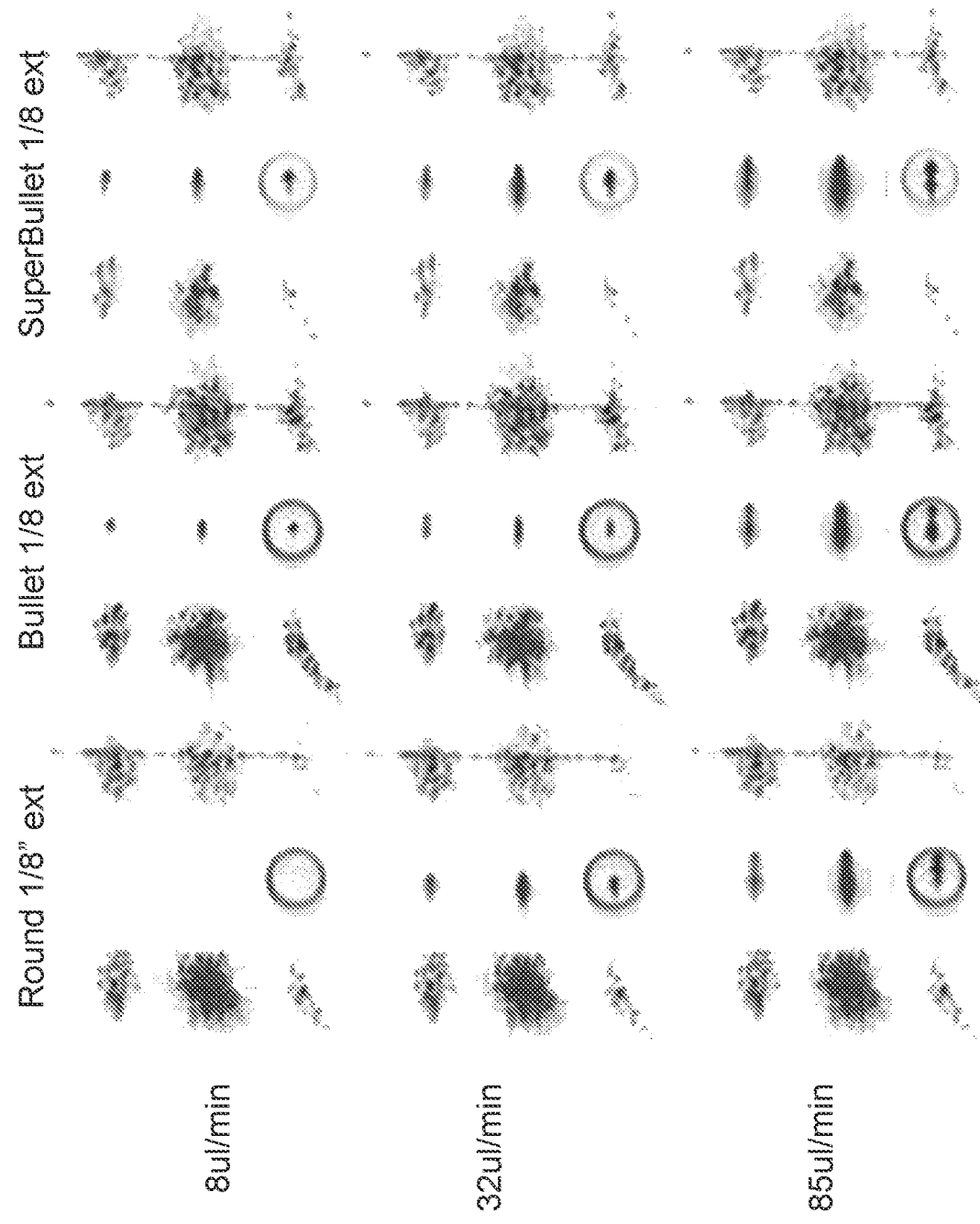
FIG. 8 presents images from a live core stream being interrogated by lasers.

Images taken from the camera for each of the sample injection needles are shown in FIG. 8. As shown in FIG. 8, the center portion of each image depicts core stream geometry. Qualitative results for each sample injection needle at the different extensions were tabulated and are shown below in Table 1.

TABLE 1

| | | 8 µl/min | | 32 µl/min | | 85 µl/min | |
|---|---|---|---|---|---|---|---|
| Tip shape | Exten. length | Sample core established? (Y/N) | Sample core centered? (Y/N) | Sample core established? (Y/N) | Sample core centered? (Y/N) | Sample core established? (Y/N) | Sample core centered? (Y/N) |
| Round | 0" | Y | Y | Y | N | N | N |
| | ⅛" | Y | Y | Y | Y | Y | Y |
| Bullet | 0" | Y | Y | Y | N | N | N |
| | 1/16" | Y | Y | Y | N | N | N |
| | ⅛" | Y | Y | Y | Y | Y | Y |
| Super-bullet | 0" | Y | Y | Y | N | N | N |
| | 1/16" | Y | Y | Y | Y | Y | Y |
| | ⅛" | Y | Y | Y | Y | Y | Y |

Needle comparison at different sample flow speeds (all at sheath flow of 1 m/s)

Discussion

The results showed that ⅛" extension had the best result for all tip shapes. The sample core could establish and was centered. However, with respect to shorter extensions (e.g., ¹⁄₁₆" extension), the more tapered the tip the better performance. The bullet ¹⁄₁₆" sample core was not centered and failed at 32 µl/min and 64 µl/min, whereas the super bullet passed both criteria at both sample flow speeds.

CONCLUSION

This comparison study showed that a longer needle and more tapered tip can produce a centered and stable sample core. From this comparison study, the super bullet shape (most tapered) at ⅛" extended is the best injection needle candidate moving forward. It was thereby shown that sample injection needles can be configured and positioned to maintain an intact core stream under flow conditions that vary by a magnitude or more.

Although the foregoing invention has been described in some detail by way of illustration and example for purposes of clarity of understanding, it is readily apparent to those of ordinary skill in the art in light of the teachings of this invention that some changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A flow cytometer comprising:
   a flow cell for transporting particles in a core stream of a flow stream from a proximal end to a distal end, wherein the flow cell comprises a flow cell cone at the proximal end;
   a sheath fluid introduction port for delivering sheath fluid to the flow cell; and
   a sample injection needle having a passage running therethrough for delivering sample fluid from a sample injection line at a proximal end to the flow cell at a distal end to generate the core stream, wherein the distal end of the sample injection needle is positioned within the flow cell cone and is separated from the sheath fluid introduction port by a longitudinal distance ranging from 17 mm to 26 mm.

2. The flow cytometer according to claim 1, wherein the distal end of the sample injection needle is separated from the sheath fluid introduction port by a longitudinal distance ranging from 20 mm to 22 mm.

3. The flow cytometer according to claim 1, wherein the sample injection needle is configured and positioned to maintain an intact core stream under the condition that the flow rate of the flow stream ranges from 0.5 m/s to 10 m/s.

4. The flow cytometer according to claim 1, wherein the sample injection needle is configured and positioned to maintain an intact core stream under the condition that the flow rate of the sample fluid ranges from 1 µl/min to 150 µl/min.

5. The flow cytometer according to claim 1, wherein the sample injection needle comprises an inner diameter ranging from 0.2 mm to 0.4 mm.

6. The flow cytometer according to claim 5, wherein the sample injection needle comprises an inner diameter ranging from 0.25 mm to 0.30 mm.

7. The flow cytometer according to claim 1, wherein the sample injection needle comprises a taper at the distal end.

8. The flow cytometer according to claim 7, wherein the taper begins at a location along the length of the sample injection needle that is separated from the distal end by a distance ranging from 3.5 mm to 4.0 mm.

9. The flow cytometer according to claim 8, wherein the taper begins at a location along the length of the sample injection needle that is separated from the distal end by a distance ranging from 3.8 mm to 3.9 mm.

10. The flow cytometer according to claim 7, wherein the taper begins at a location along the length of the sample injection needle that is separated from the distal end by a distance ranging from 1.5 mm to 2.0 mm.

11. The flow cytometer according to claim 10, wherein the taper begins at a location along the length of the sample injection needle that is separated from the distal end by a distance ranging from 1.7 mm to 1.8 mm.

12. The flow cytometer according to claim 7, wherein the taper comprises a taper range of 2.5 mm-12 mm radius across a length of 1.75 mm-4 mm.

13. The flow cytometer according to claim 1, wherein the sample injection needle comprises a rounded distal end.

14. The flow cytometer according to claim 1, wherein the flow cytometer comprises a plurality of sheath fluid introduction ports.

15. The flow cytometer according to claim 14, wherein the flow cytometer comprises 2 sheath fluid introduction ports.

16. The flow cytometer according to claim 1, further comprising a light source configured to illuminate the flow cell at an interrogation point.

17. The flow cytometer according to claim 1, further comprising a detector configured to collect light from the flow cell.

18. The flow cytometer according to claim 1, further comprising a vacuum configured to draw fluid through the flow cell.

19. The flow cytometer according to claim 1, wherein the sample injection needle is unflattened at the distal end.

20. The flow cytometer according to claim 1, wherein the distal end of the sample injection needle is separated from an interrogation point at which light intersects the flow stream by a distance ranging from 13 mm to 17 mm.

* * * * *